United States Patent [19]

Shimizu et al.

[11] Patent Number: 5,777,861
[45] Date of Patent: Jul. 7, 1998

[54] POWER SUPPLY APPARATUS HAVING HIGH POWER-FACTOR AND LOW DISTORTION-FACTOR CHARACTERISTICS

[75] Inventors: Keiichi Shimizu, Yokohama; Noriyuki Kitamura, Yokosuka; Tsutomu Kakitani, Yokohama; Nanjou Aoike, Yokohama; Fumihiko Nagasaki, Yokohama; Yuji Takahashi, Hachioji, all of Japan

[73] Assignee: Toshiba Lighting & Technology Corporation, Tokyo, Japan

[21] Appl. No.: 430,367

[22] Filed: Apr. 28, 1995

[30] Foreign Application Priority Data

| Apr. 28, 1994 | [JP] | Japan | 6-092761 |
| Jul. 29, 1994 | [JP] | Japan | 6-178925 |
| Feb. 28, 1995 | [JP] | Japan | 7-041120 |

[51] Int. Cl.⁶ .......................... H02M 5/458; H05B 37/02
[52] U.S. Cl. .......................... 363/37; 315/209 R
[58] Field of Search .................. 363/37, 98; 323/222; 315/209 R

[56] References Cited

U.S. PATENT DOCUMENTS

| 5,063,490 | 11/1991 | Maehara et al. | 363/37 |
| 5,097,181 | 3/1992 | Kakitani | 315/209 |
| 5,166,579 | 11/1992 | Kawabata et al. | 315/209 R |
| 5,274,540 | 12/1993 | Maehara | 363/37 |
| 5,410,466 | 4/1995 | Maehara | 363/98 |
| 5,459,651 | 10/1995 | Maehara et al. | 363/34 |

FOREIGN PATENT DOCUMENTS

| 0 352 703 | 1/1990 | European Pat. Off. . |
| 0 420 251 | 4/1991 | European Pat. Off. . |
| 0 492 715 | 7/1992 | European Pat. Off. . |
| 59-78496 | 5/1984 | Japan . |
| 60-134776 | 7/1985 | Japan . |
| 2-75200 | 3/1990 | Japan . |
| 5-9918 | 2/1993 | Japan . |
| 5-174986 | 7/1993 | Japan . |

*Primary Examiner*—Peter S. Wong
*Assistant Examiner*—Rajnikant B. Patel
*Attorney, Agent, or Firm*—Oblon, Spivak, McClelland, Maier & Neustadt, P.C.

[57] ABSTRACT

A rectification device rectifies an input voltage from an AC power source. First and second switching devices are arranged between a pair of output terminals of the rectification device and alternately turned on/off. A series circuit of a first capacitor and an inductor is arranged between the two terminals of one of the first and second switching devices so as to perform a smoothing operation with respect to the frequency of an output from the rectification device. A second capacitor serves to form a resonance circuit in cooperation with the inductor in accordance with the ON/OFF operations of the first and second switching devices. The capacitance of the second capacitor is smaller than that of the first capacitor.

29 Claims, 24 Drawing Sheets

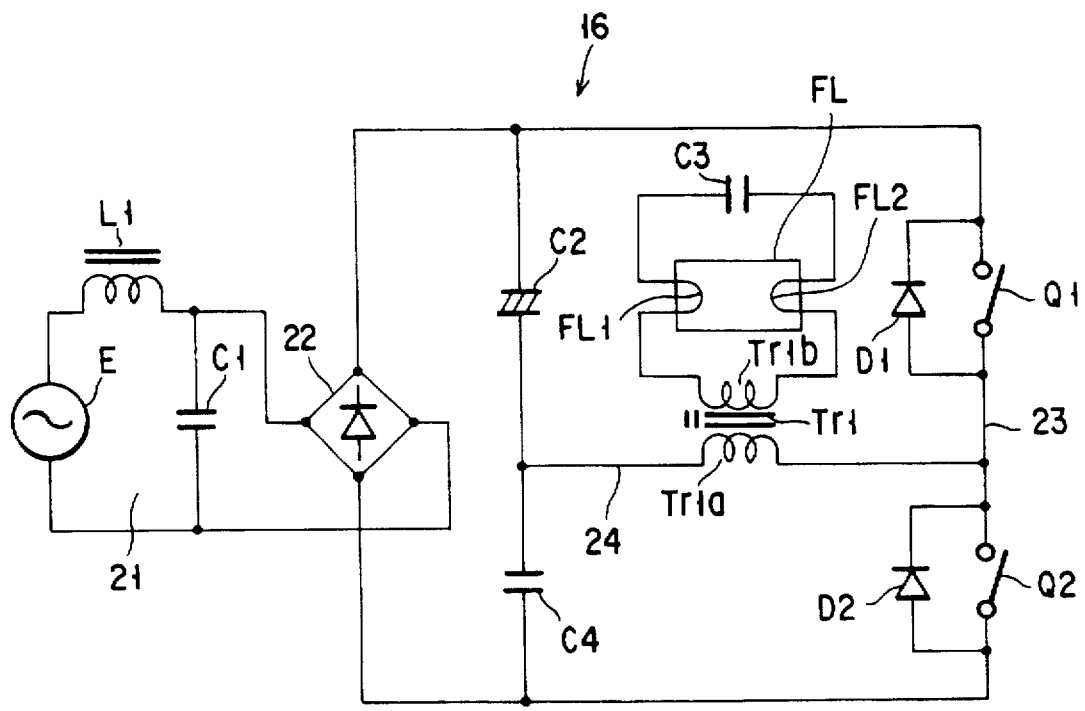
F I G. 1
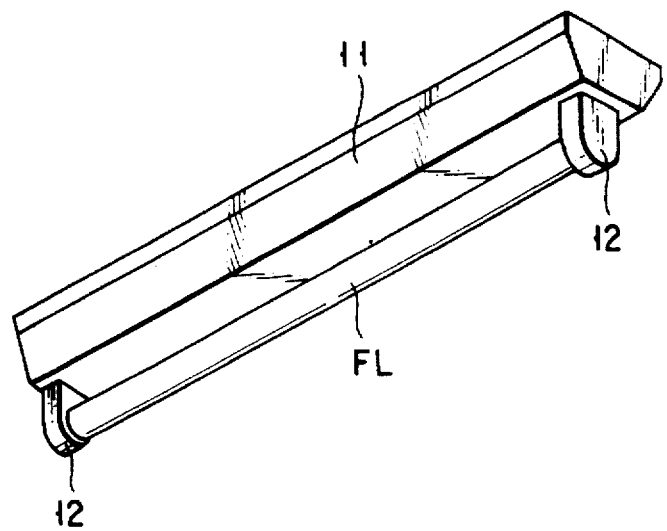
F I G. 2

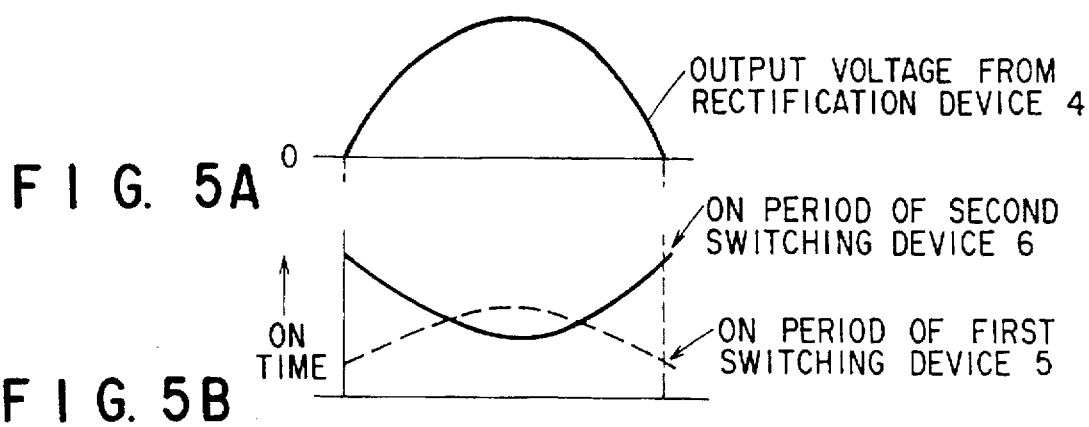
FIG. 5A
FIG. 5B
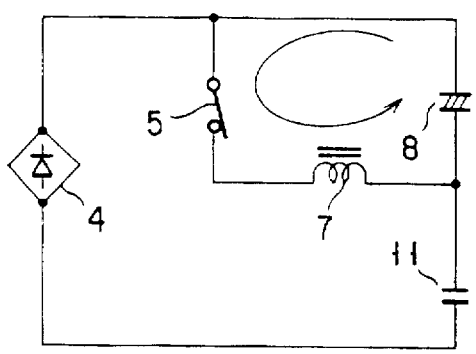
FIG. 6A
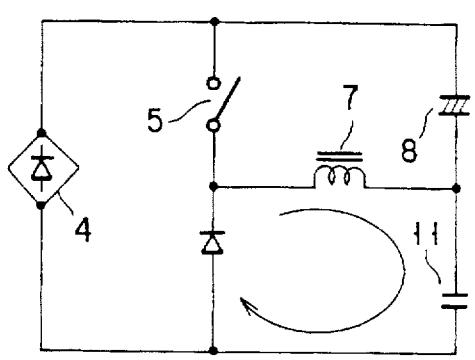
FIG. 6B
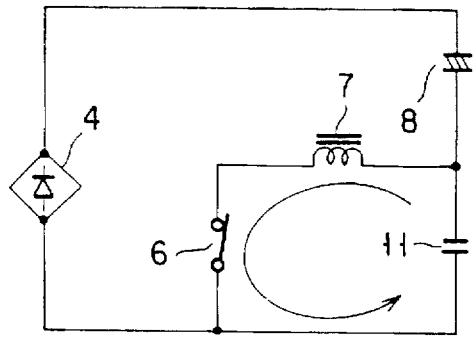
FIG. 6C
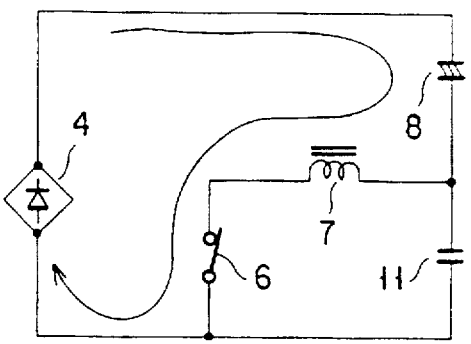
FIG. 6D
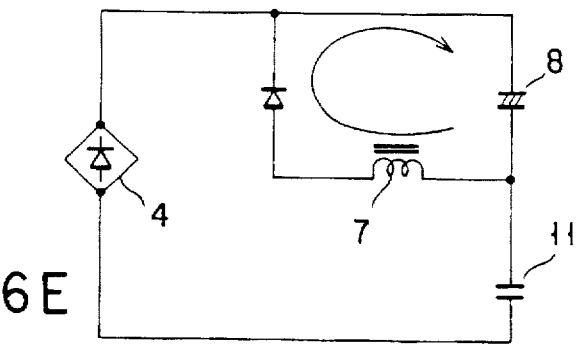
FIG. 6E

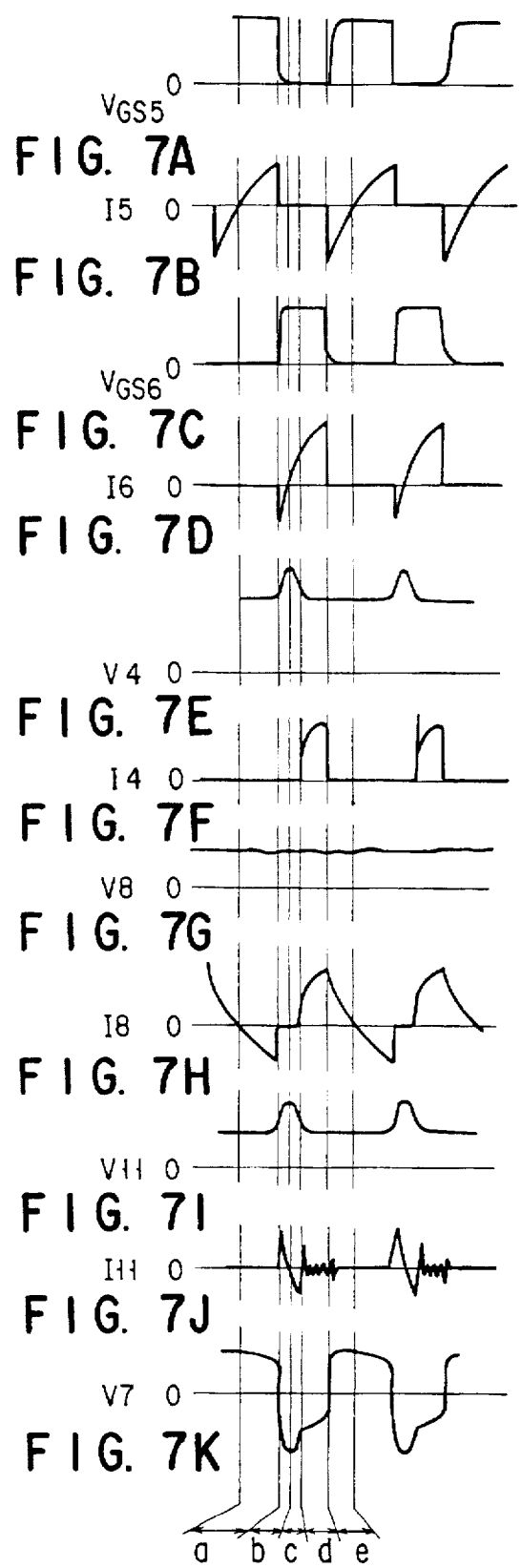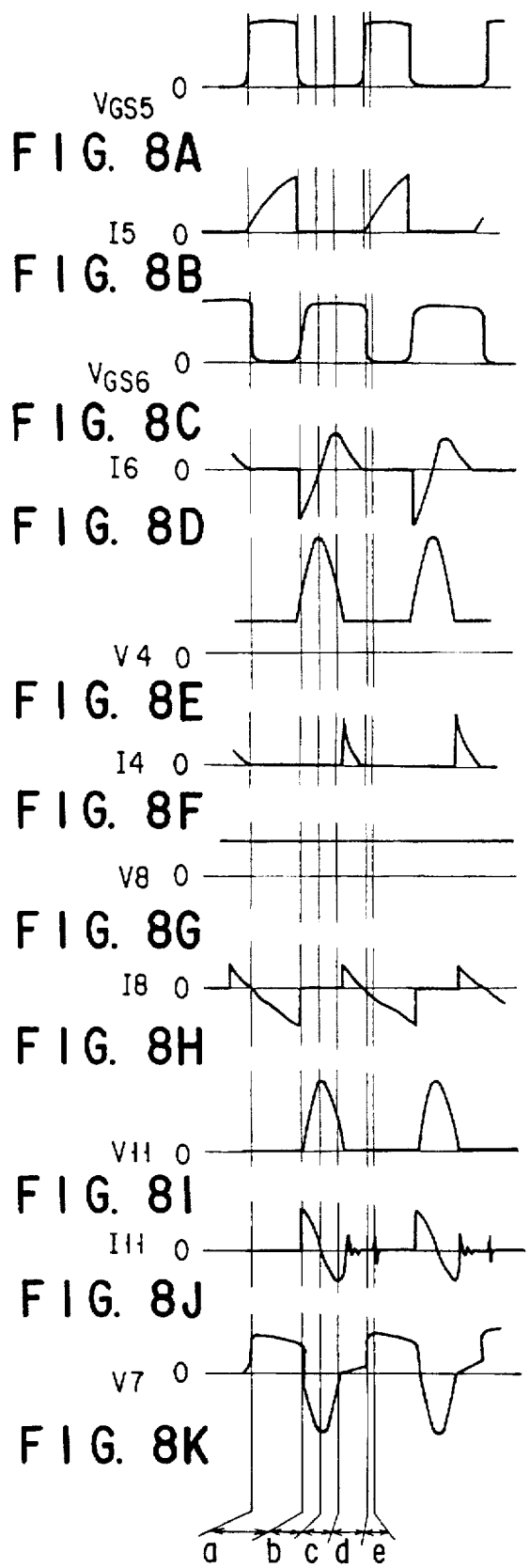

FIG. 9A  V<sub>GS5</sub>
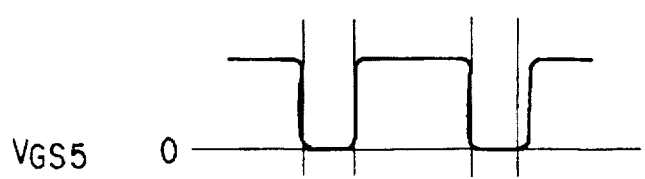
FIG. 9B  I5
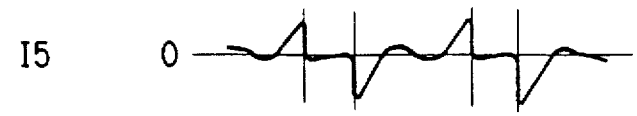
FIG. 9C  V<sub>GS6</sub>
FIG. 9D  I6
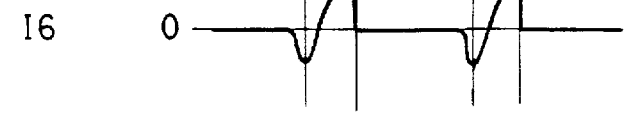
FIG. 9E  V4
FIG. 9F  I4
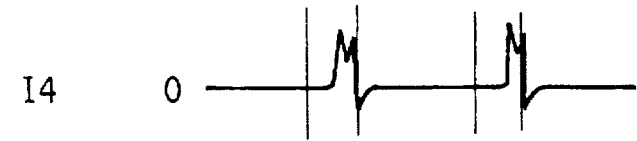
FIG. 9G  V8
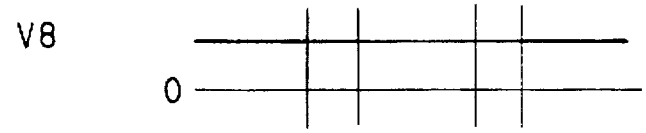
FIG. 9H  I8
FIG. 9I  V11
FIG. 9J  I11
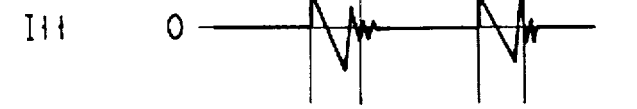

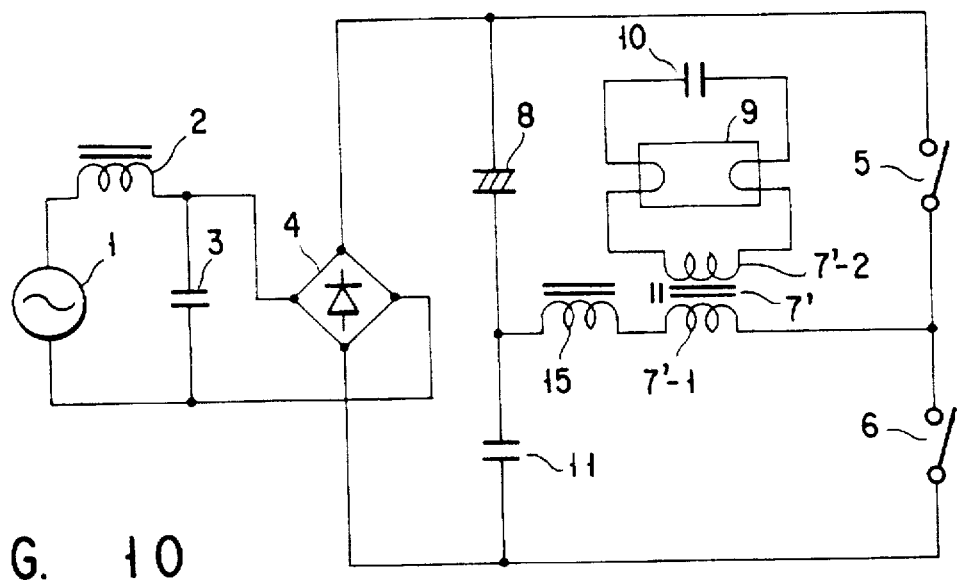
F I G. 10
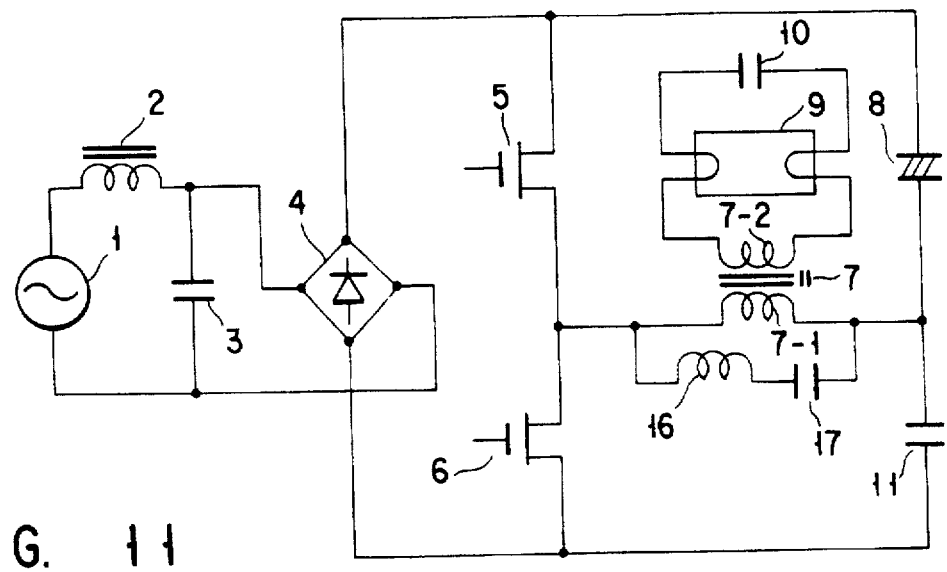
F I G. 11
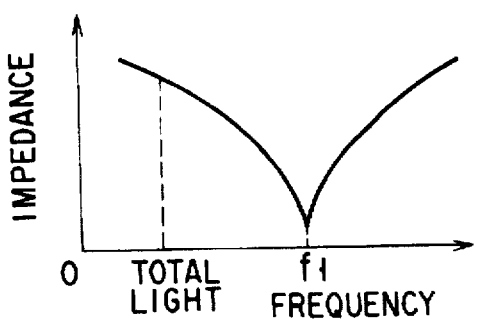
F I G. 12

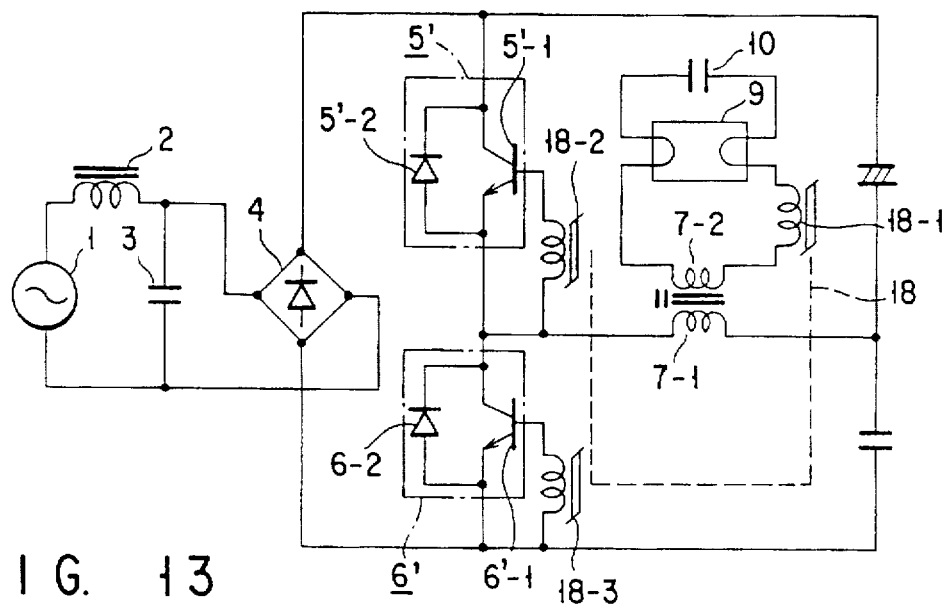
F I G. 13
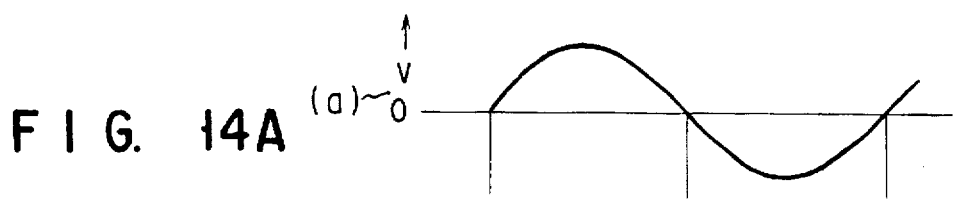
F I G. 14A
F I G. 14B
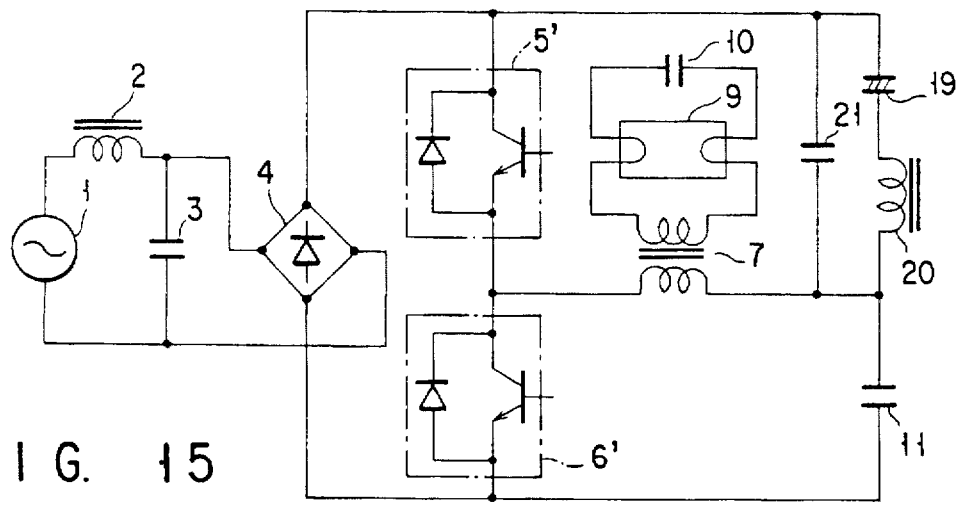
F I G. 15

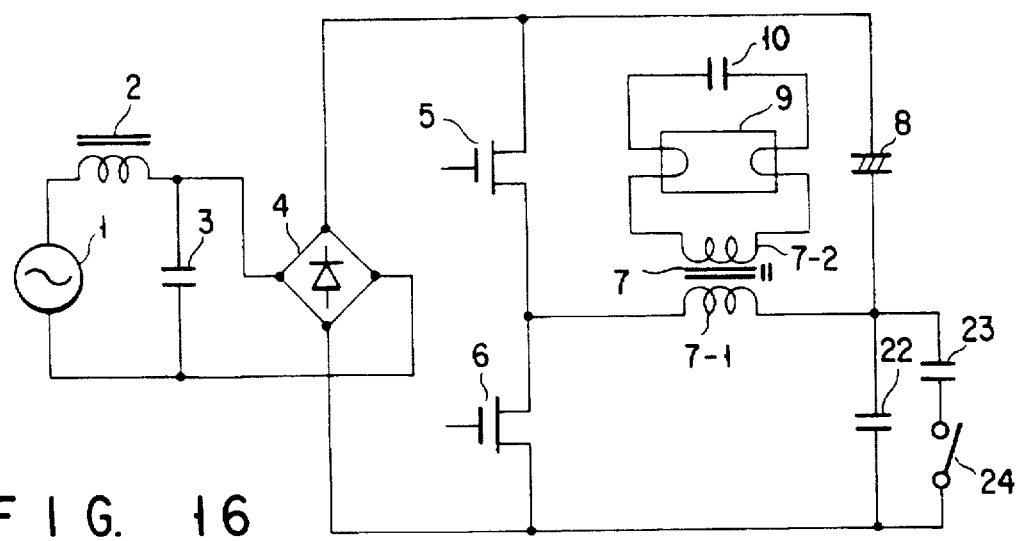
F I G. 16
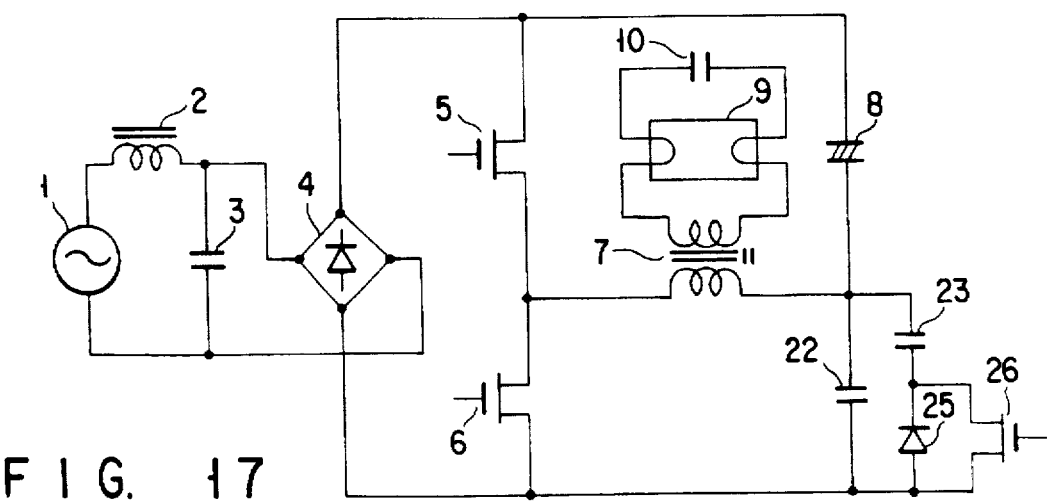
F I G. 17
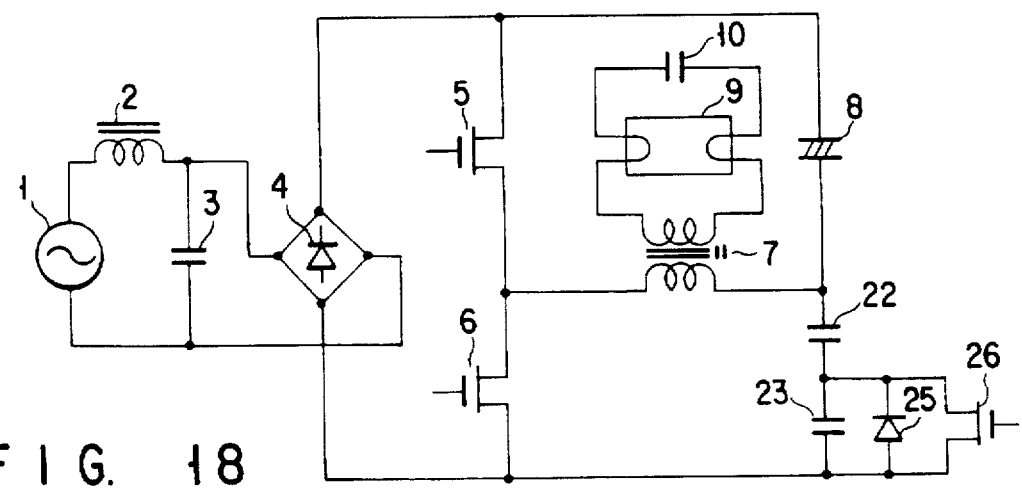
F I G. 18

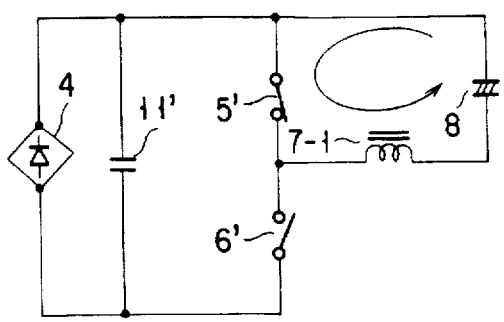
FIG. 21A
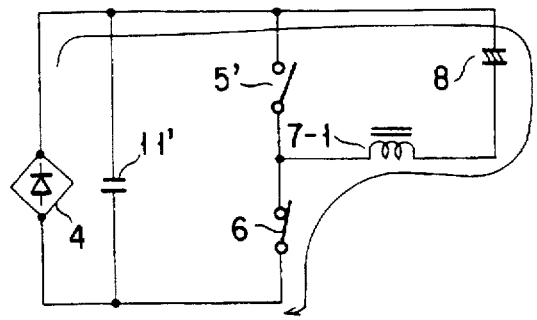
FIG. 21D
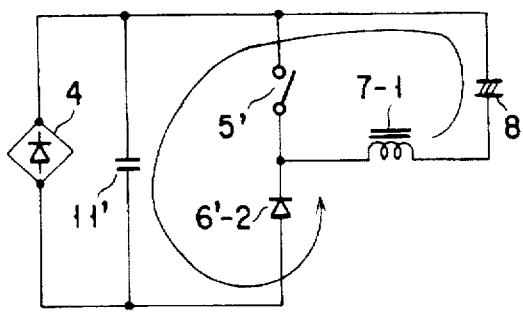
FIG. 21B
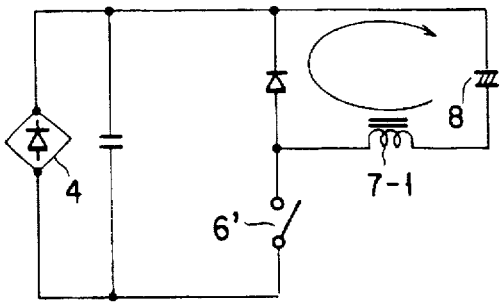
FIG. 21E
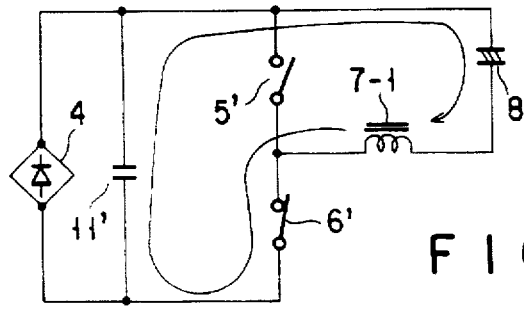
FIG. 21C
INPUT VOLTAGE Vin
FIG. 22A
INPUT CURRENT Iin
FIG. 22B

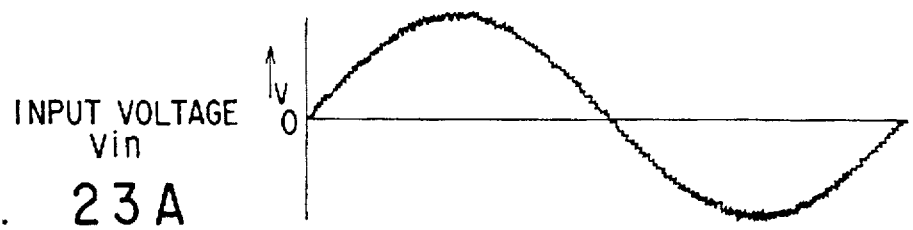
FIG. 23A INPUT VOLTAGE Vin
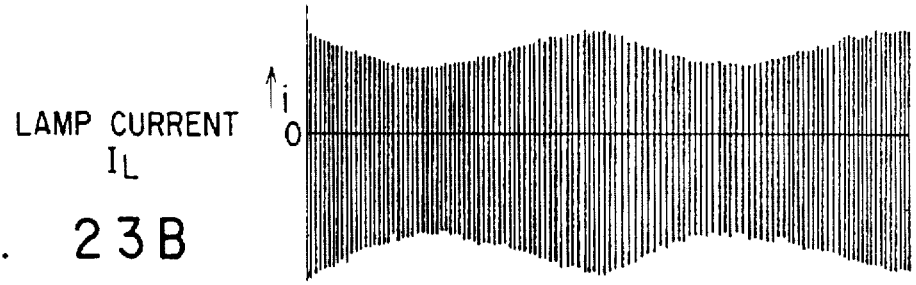
FIG. 23B LAMP CURRENT $I_L$
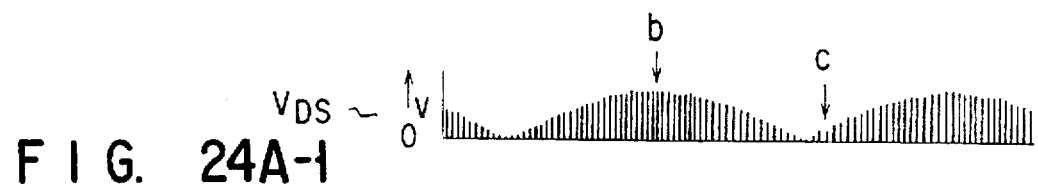
FIG. 24A-1 $V_{DS}$
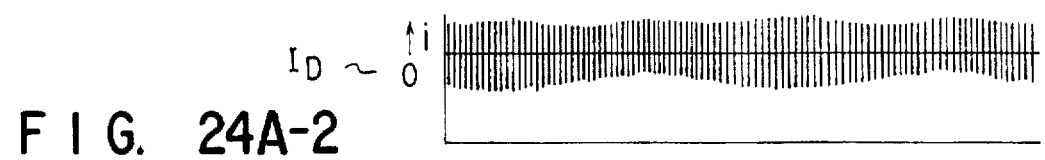
FIG. 24A-2 $I_D$
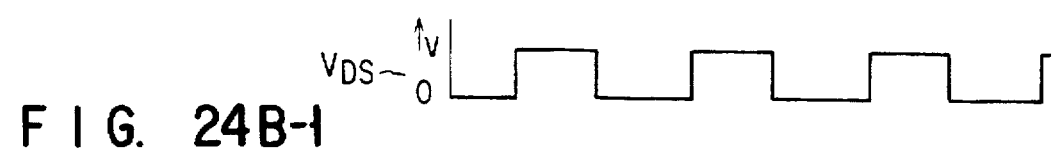
FIG. 24B-1 $V_{DS}$
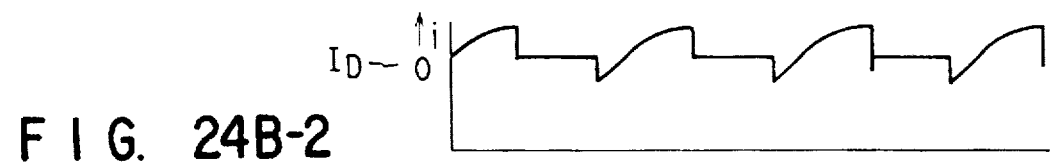
FIG. 24B-2 $I_D$
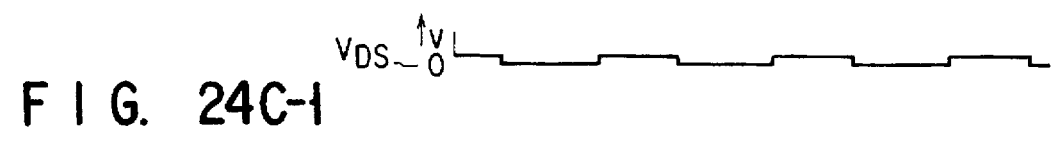
FIG. 24C-1 $V_{DS}$
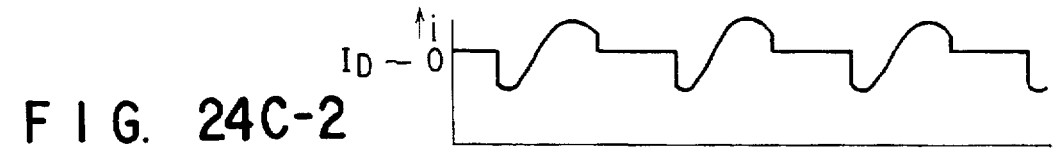
FIG. 24C-2 $I_D$

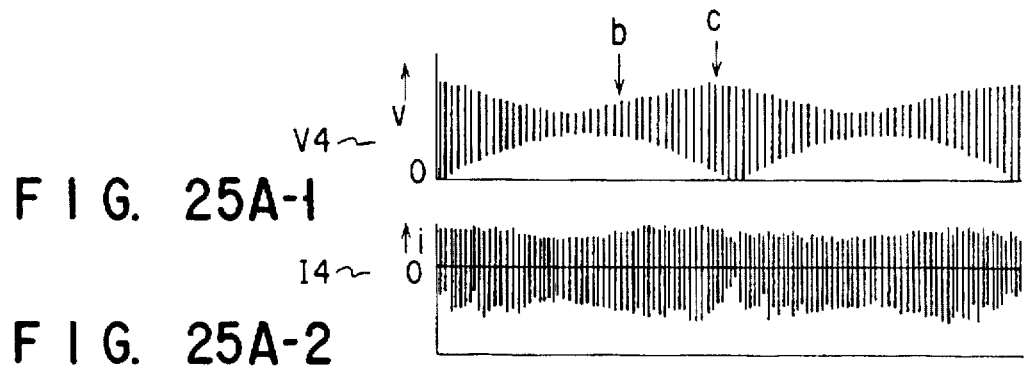
FIG. 25A-1
FIG. 25A-2
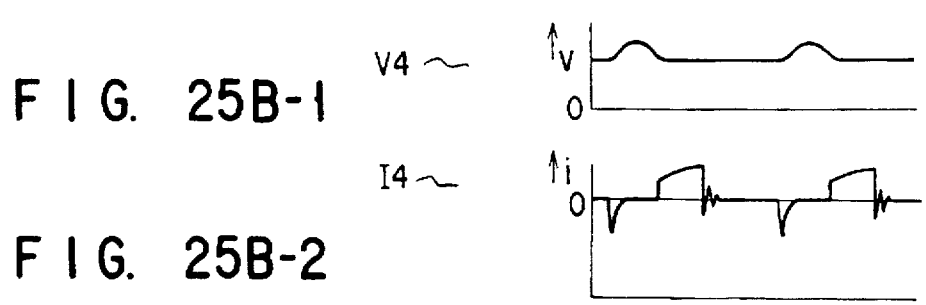
FIG. 25B-1
FIG. 25B-2
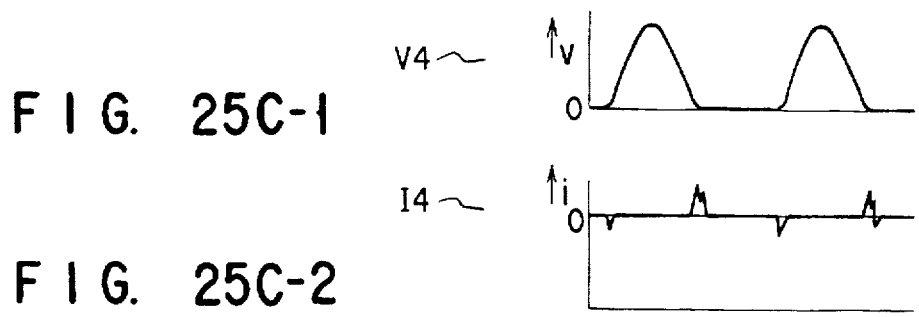
FIG. 25C-1
FIG. 25C-2
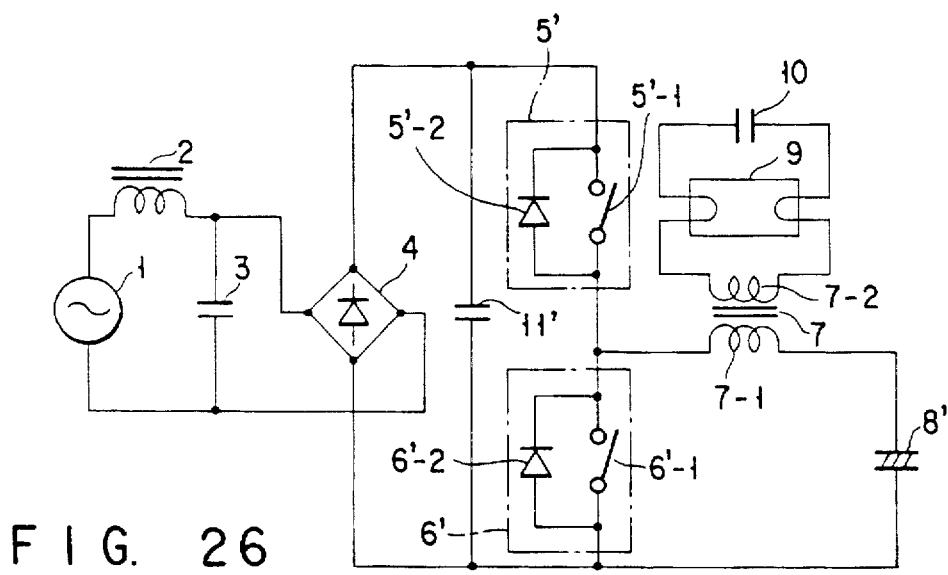
FIG. 26

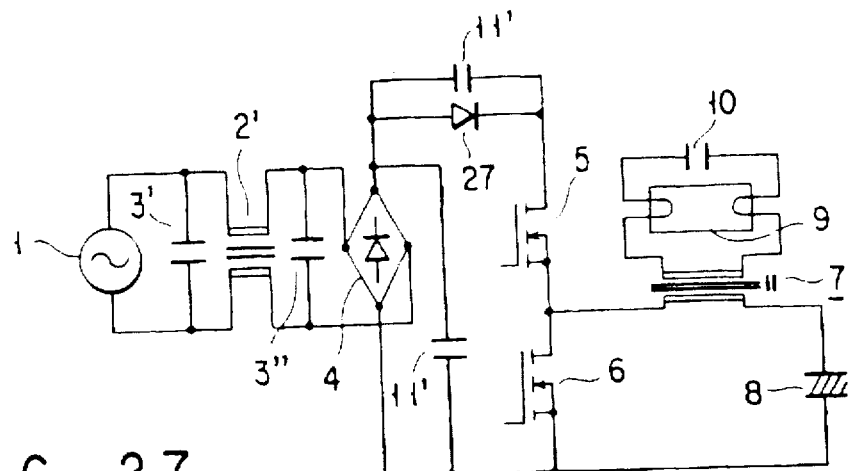
F I G. 27
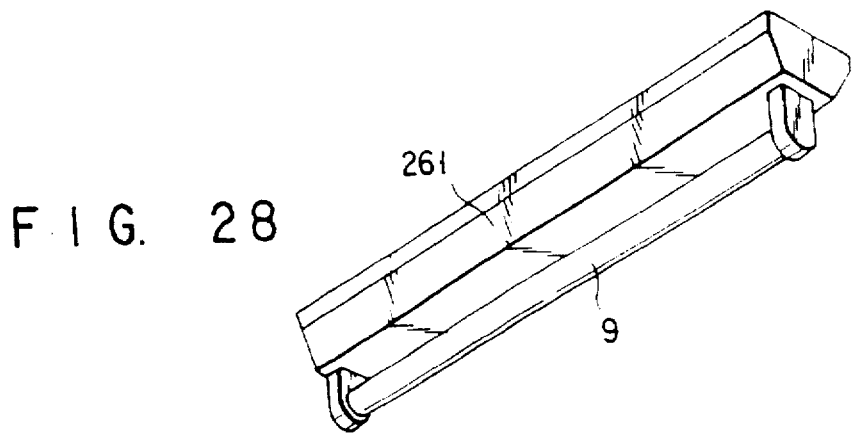
F I G. 28
F I G. 30A
F I G. 30B
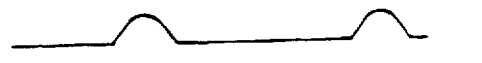
F I G. 30C
F I G. 30D
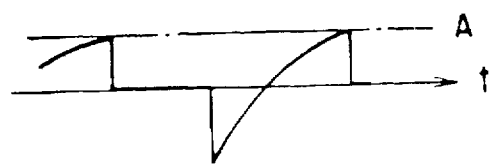
F I G. 30E

F I G. 31 A 
F I G. 31 C 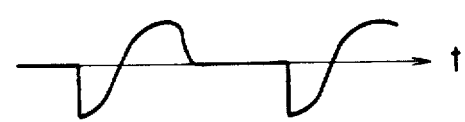
F I G. 31 B 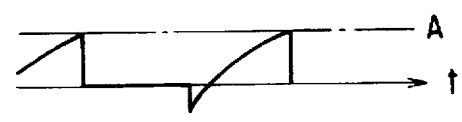
F I G. 32 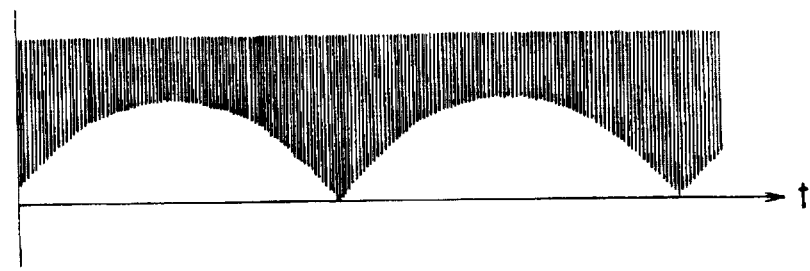
F I G. 33 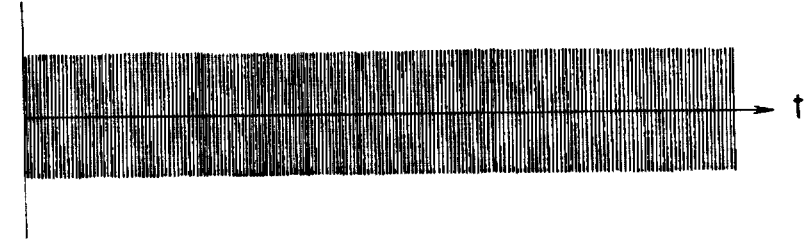
F I G. 36 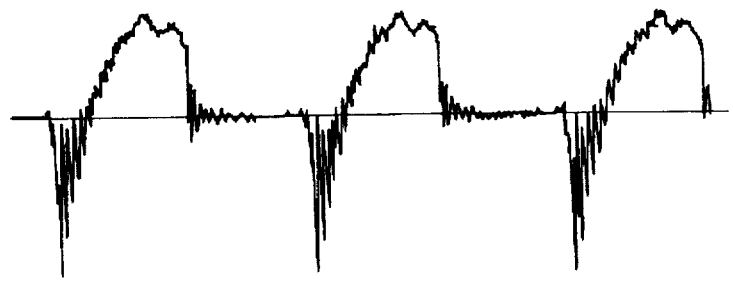
F I G. 37 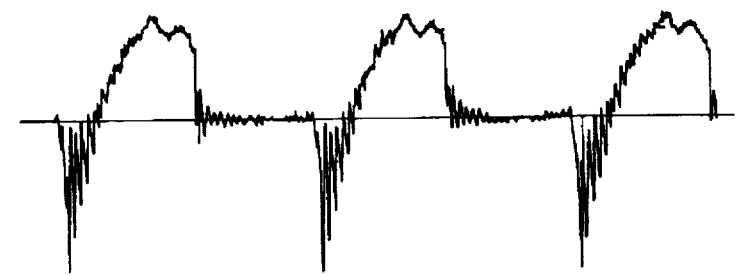

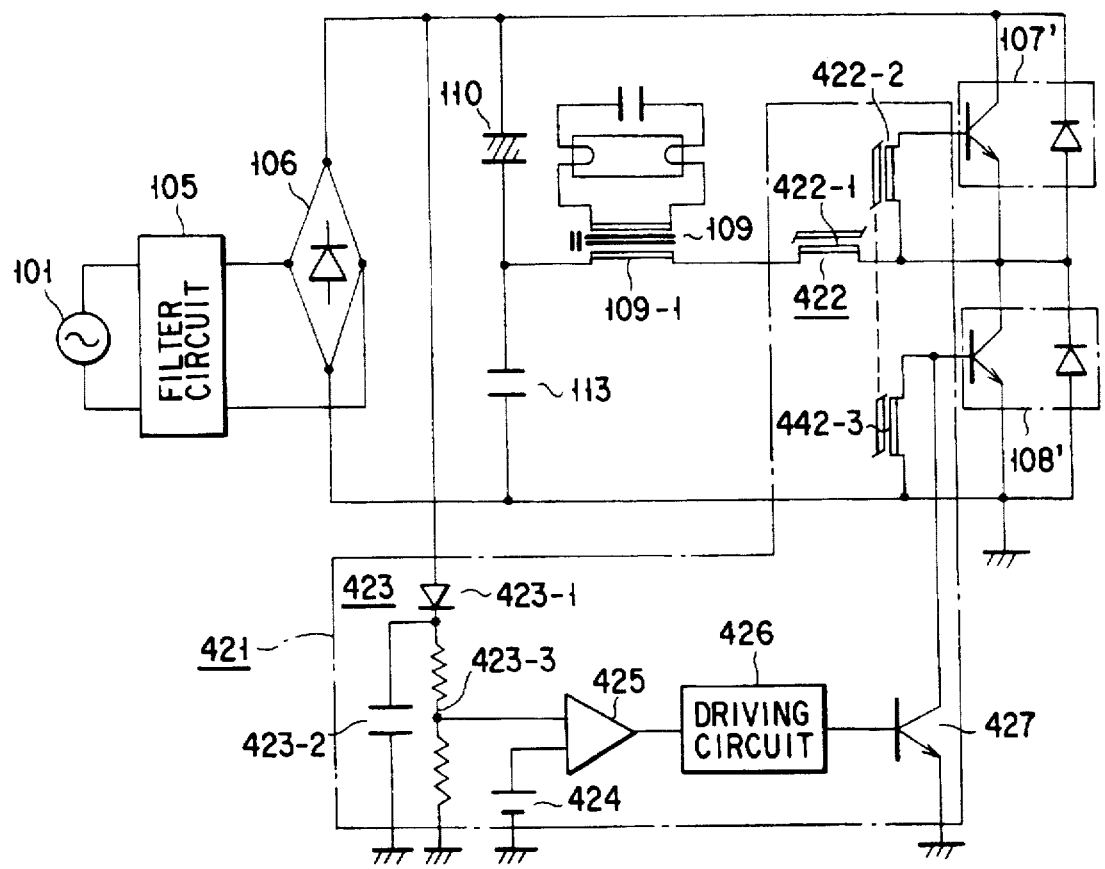
F I G. 40
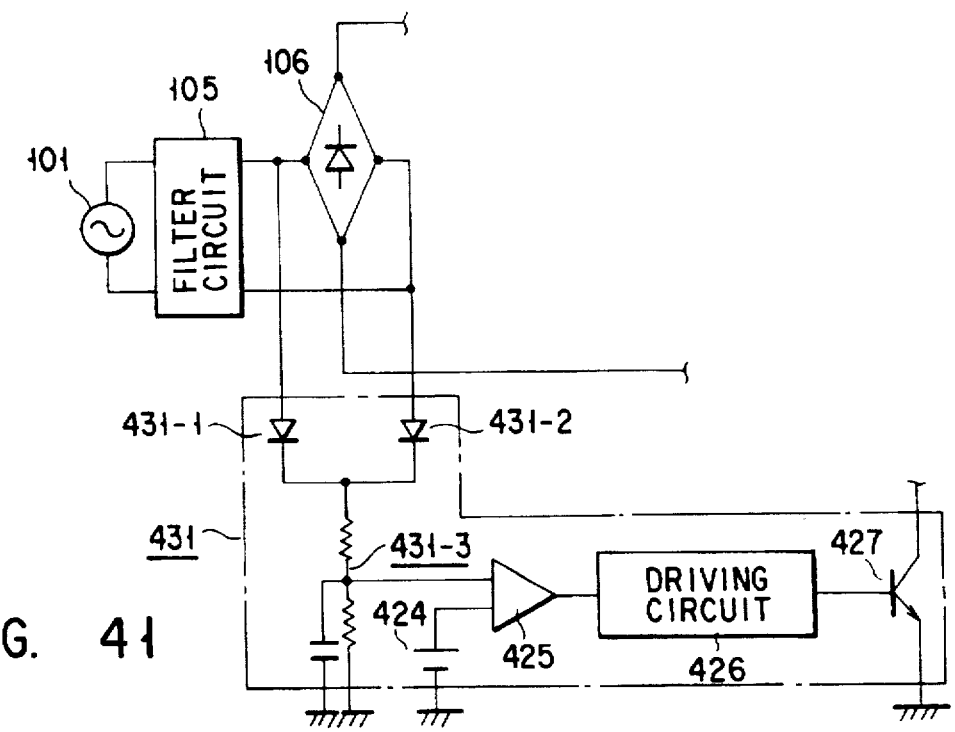
F I G. 41

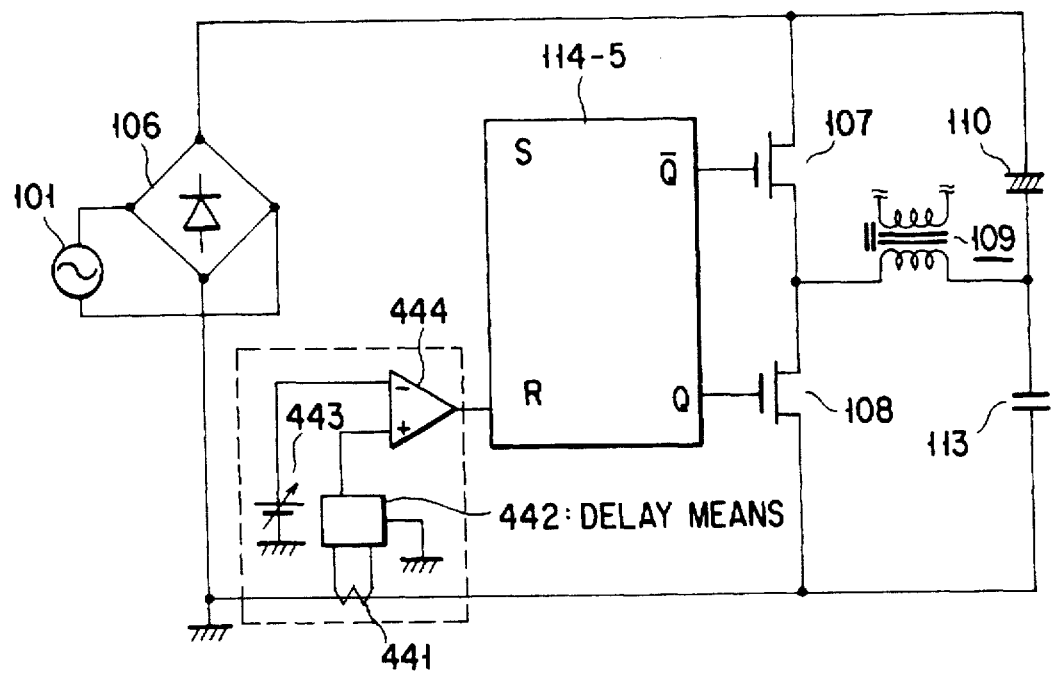
F I G. 42
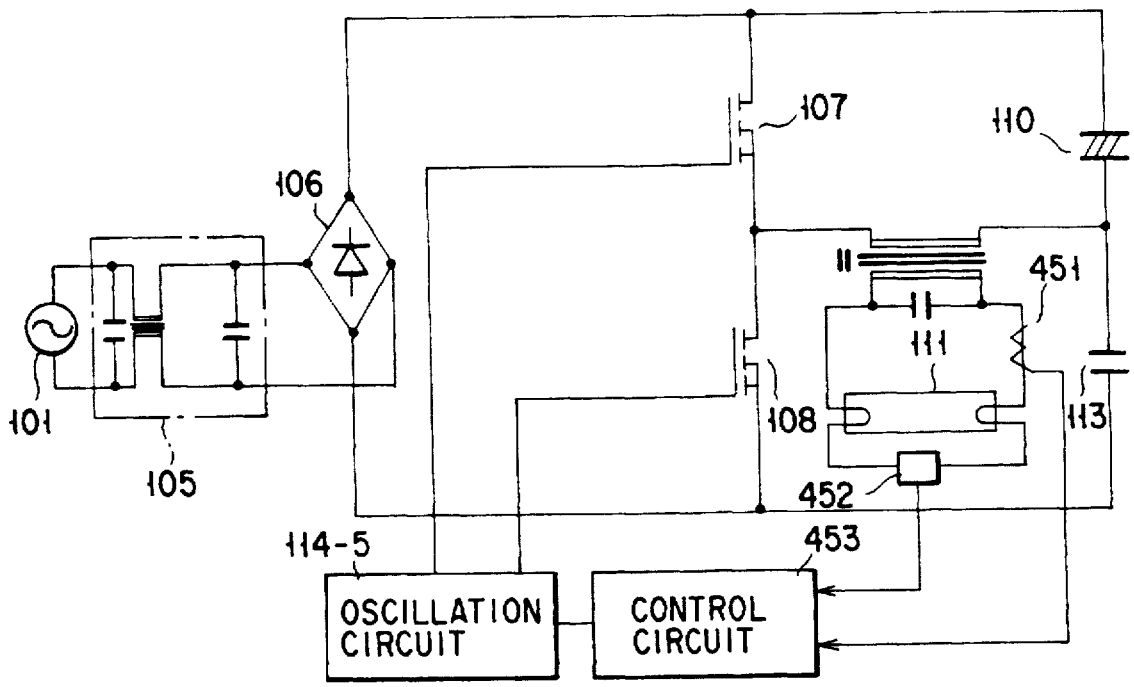
F I G. 43

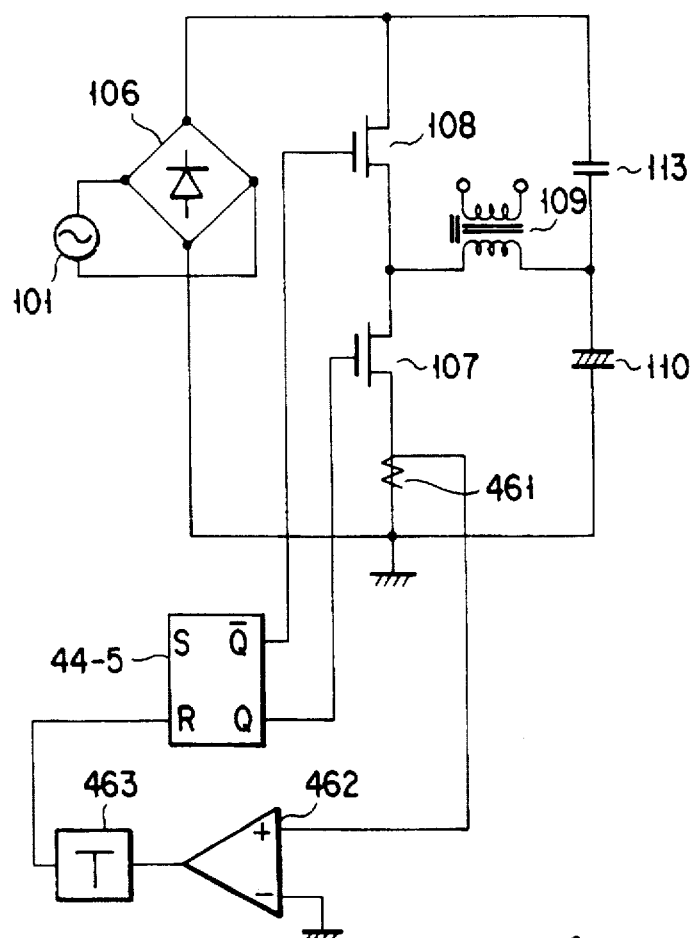
F I G. 44
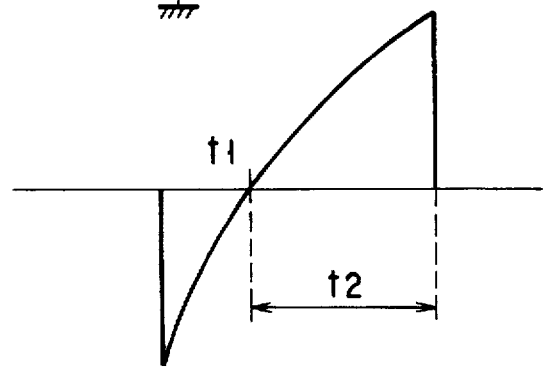
F I G. 45
F I G. 47A
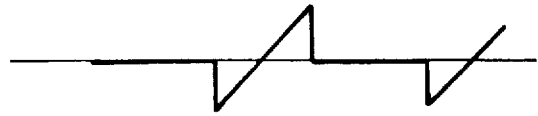
F I G. 47B
F I G. 47C

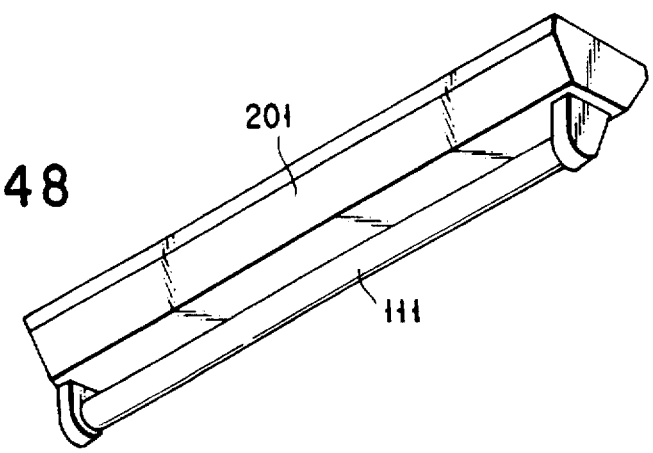
F I G. 48

POWER SUPPLY APPARATUS HAVING HIGH POWER-FACTOR AND LOW DISTORTION-FACTOR CHARACTERISTICS

BACKGROUND OF THE INVENTION

1. Field of the Invention

The present invention relates to a power supply apparatus which improves the input power factor from an AC power source, reduces the distortion of an input current, and suppresses harmonic components and, more particularly, to a power supply apparatus suitable for a discharge lamp lighting apparatus and an illumination apparatus.

2. Description of the Related Art

As a conventional discharge lamp lighting apparatus of this type, an apparatus having the arrangement disclosed in Jpn. Pat. Appln. KOKAI Publication No. 5-174986 is known.

In this discharge lamp lighting apparatus disclosed in Jpn. Pat. Appln. KOKAI Publication No. 5-174986, a half-bridge type inverter circuit having two series-connected switching elements is connected to a full-wave rectifier for rectifying a voltage from a commercial AC power source, a series circuit of a load circuit having an inductance and a direct current blocking capacitor is connected to one of the switching elements of the inverter circuit.

This discharge lamp lighting apparatus disclosed in Jpn. Pat. Appln. KOKAI Publication No. 5-174986 will be described as prior art 1.

In prior art 1, as shown in FIG. 50, a coil 273 and a capacitor 274 are arranged on the input side of a full-wave rectifier 272 for rectifying an output voltage from a commercial AC power source 271. A capacitor 275 whose constant is set in a certain range is arranged on the output side of the full-wave rectifier 272. A half-bridge type inverter circuit 278 having two series-connected switching elements 276 and 277 is connected to the capacitor 275 in a parallel connection form between the output terminals of the full-wave rectifier 272. A series circuit of an inductance 279, a discharge lamp 280, and a DC blocking capacitor 281 is connected to one switching element 277 of the inverter circuit 278.

The effects of prior art 1 are not described in detail. However, the effects can be estimated as follows from the description of the object and the timing charts and the like.

The capacitor 275 on the output side of the full-wave rectifier 272 performs a smoothing operation with respect to the frequency of the AC power source 271 to a certain degree. At the same time, the coil 273 and the capacitor 274 on the input side of the full-wave rectifier 272 generate a resonance voltage. This resonance voltage is generated in synchronism with the switching period of the switching element 276 of the half-bridge type inverter circuit 278. In the ON period of the switching element 276, power is supplied first from the capacitor 275 to the inverter circuit 278, but a voltage drop occurs because the capacitance of the capacitor 275 is set to be small. Thereafter, a current flows from the commercial AC power source 271 into the inverter circuit 278. When the switching element 276 is turned off, the inflow current is cut off, and the above resonance voltage is generated. When the circuit constant defined by the coil 273 and the capacitor 274 is set in a predetermined range, this resonance voltage becomes higher than the voltage across the capacitor 275 having the smoothing function. Therefore, a current flows into the capacitor 275 owing to the resonance voltage serving as a power source. With this operation, an input current flows even in a period in which the input AC voltage is low, thereby realizing a high input power factor and a reduction in input current distortion.

As another conventional apparatus, the apparatus disclosed in Jpn. Pat. Appln. KOKAI Publication No. 2-75200 (to be referred to as prior art 2 hereinafter) is known.

As shown in FIG. 51, this apparatus includes a pair of switching devices 285 and 286 arranged between the output terminals of a rectifier 284 for receiving an output from an AC power source 282 via a high frequency blocking device 283. Diodes 287 and 288 for supplying currents in opposite directions are connected in parallel with the switching devices 285 and 286. Two series-connected capacitors 289 and 290 are connected in parallel with the switching devices 285 and 286. The capacitance of one capacitor 290 is set to be larger than that of the other capacitor 289. A diode 291 is connected in parallel with the capacitor 289 having a relatively small capacitance. A series circuit of an inductor 292 and a discharge lamp 293 is connected between the node of the pair of switching devices 285 and 286 and the node of the capacitors 289 and 290. In addition, a capacitor 294 is connected between ends of the filaments of the discharge lamp 293.

According to prior Art 2, in the ON period of the switching device 285, a current is supplied to the inductor 292 and the discharge lamp 293 via the switching device 285 by using an output from the rectifier 284, and the capacitor 290 having a large capacitance is charged. In the interval between the instant at which the switching device 285 is turned off and the instant at which the other switching device 286 is turned on, a current is supplied to the capacitor 290 and the diode 288 by using the energy stored in the inductor 292. When the switching device 286 is turned on, the charges in the capacitor 290 are discharged via the switching device 286, the inductor 292, and the discharge lamp 293. In the subsequent interval between the instant at which the switching device 286 is turned off and the instant at which the other capacitor 275 is turned on, a current is supplied to the capacitor 289 having a small capacitance and the diode 287 by using the energy stored in the inductor 292.

In this manner, a high-frequency AC current flows in the discharge lamp 293. Furthermore, in the ON period of the switching device 285, a current flows to charge the capacitor 290 having a large capacitance so as to make the input current approach a sine wave.

In prior art 1, however, it seems to be difficult to perform a sufficient smoothing operation or attain a sufficient reduction in input current distortion. This is because a current flowing from the AC power source 271 into the inverter circuit 278 is zero or very small near a zero-crossing point of the AC power source 271, and a high resonance voltage cannot be obtained. More specifically, when a sufficient smoothing operation is to be performed by the capacitor 275, no input current can be supplied near a zero-crossing point of the AC power source 271, and a high resonance voltage cannot be obtained because of the above reason. During this period, no input current can be supplied from the AC power source 271. Therefore, a sufficient reduction in input current distortion cannot be attained. If the voltage of the capacitor 275 decreases near a zero-crossing point of the AC power source 271, a sufficiently smoothed voltage cannot be obtained. As described above, in prior art 1, if the circuit constant is set to attain a reduction in input current distortion, the input voltage cannot be sufficiently smoothed. For this reason, the pulsation of a lamp current increases to cause a decrease in luminous efficacy or an increase in light ripple.

In addition, according to prior art 1, when the resonance voltage is generated, a high-frequency ripple voltage appears on the AC power source side. Consequently, a special filter for reducing the ripple voltage is required other than the inductor 273 and the capacitor 274.

According to prior art2, in a period in which the peak value of an output voltage from the rectifier 284 (a period in which the pulsating output voltage from the rectifier 284 is zero or near zero), no input current can be supplied. In this period, a charge of the capacitor 290 having a large capacitance discharges. Therefore, in this period, only a discharge current from the current capacitor 290 together with a regenerative current generated by the energy based on this discharge current and stored in the inductor 292 and flowing via the diode 291. Such phenomenon occurs for the following reason. Because, the voltage across a series circuit of the capacitors 289 and 290 is larger than the output voltage from the rectifier 284, in this period. As described above, according to prior art2, in some period, no input current can be supplied from the commercial power source 282 (rectifier 284), resulting in an insufficient reduction in input current distortion.

SUMMARY OF THE INVENTION

The present invention has been made to solve the above problems, and has as its object to provide a new and improved power supply apparatus which reduces the pulsation of an output current by smoothing an input voltage, improves the input power factor, and reduces the harmonic wave of an input current.

It is another object of the present invention to provide a power supply apparatus which is based on an improvement on the above power supply apparatus, and reliably controls a resonance voltage with a relatively simple arrangement so as to make, for example, the peak value of the resonance voltage constant.

It is still another object of the present invention to provide a power supply apparatus which can reliably attain a reduction in input current distortion in addition to the above effects.

According to the first aspect of the present invention, there is a power supply apparatus comprising a rectification device for rectifying an output voltage from an AC power source and outputting a non-smoothed DC voltage, a pair of switching devices connected to each other in a series connection form between the output terminals of the rectification device and alternately turned on/off at a frequency higher than a frequency of an output from the rectification device, a series circuit of a first capacitor and an inductor, which is connected between two terminals of the first switching device, and performs a smoothing operation with respect to the frequency of the output from the rectification device, a second capacitor for causing resonance in cooperation with the inductor in accordance with ON/OFF operations of the pair of switching devices, and an output circuit for obtaining a high-frequency output on the basis of the resonance caused by the inductor and the second capacitor.

According to the present invention, as a switching device, for example, a field-effect transistor can be used. In this case, a parasitic diode which is necessarily included in the field-effect transistor owing to its arrangement can be used to allow a reverse current to pass. Alternatively, a switching device may be mainly constituted by a switch element including no parasitic diode between the collector end the emitter, such as a bipolar transistor. In this case, a diode is connected in parallel between the collector and the emitter with the conducting direction being reversed. If, however, a diode is connected between the emitter and the base owing to the arrangement of the base circuit of the transistor, this diode may be used to allow a reverse current to pass.

In addition, in the present invention, according to the above description, the pair of switching devices are alternately turned on/off. However, in the interval from the ON state to the OFF state of one switching device and from the OFF state to the ON state of the other switching device, there may be or may not be a period in which both the switching devices are set in the OFF state. The switching frequency of the pair of switching devices is higher than the frequency of an output from the rectification device, preferably several kHz or more, and more preferably 20 kHz or more which is higher than the audio frequencies.

In the present invention, "in a series connection form" or "in a parallel connection form" means that connection of a given electrical component is made with or without the mediacy of another electrical component.

In addition, the second capacitor for forming a resonance circuit together with the inductor may be arranged at any position as long as the resonance circuit can be formed. For example, the second capacitor may be connected to a series circuit of the second switching device and the inductor in a series connection form, or may be connected between the output terminals of the rectification device. Alternatively, a portion or all of the second capacitor may be connected between one output terminal of the rectification device and the pair of switching devices.

Furthermore, in the present invention, any type of inductor may be used as long as it can resonate with the second capacitor. For example, a choke coil, a transformer, or the like may be used. (The above description applies to the following aspects of the present invention.)

According to the second aspect of the present invention, there is provided a power supply apparatus comprising a rectification device for rectifying an output voltage from an AC power source and outputting a non-smoothed DC voltage, a pair of switching devices connected to each other in a series connection form between the output terminals of the rectification device and alternately turned on/off at a frequency higher than a frequency of an output from the rectification device, a first capacitor having a relatively large capacitance and connected to one switching device in a parallel connection form, an inductor inserted between one switching device and the first capacitor, and a second capacitor having a capacitance smaller than that of the first capacitor, and forming a resonance circuit together with the other switching device and the inductor in an ON period of the second switching device.

According to the third aspect of the present invention, the power supply apparatus of the first or second aspect further comprises switching control means for turning on/off the first and second switching devices at a substantially constant frequency and capable of changing a ratio of ON periods of the switching devices.

According to the fourth aspect of the present invention, the power supply apparatus of the first or second aspect further comprises switching control means for turning on/off the first and second switching devices at a substantially constant frequency and capable of changing a ratio of ON periods of the first and second switching devices, the switching control means shortening the ON period of the other switching device when a peak value of a voltage output from the AC power source every half cycle is large, and prolonging the ON period when the peak value is small.

In the present invention, the ON period of the other switching device may be changed continuously or stepwise in accordance with the peak value.

According to the fifth aspect of the present invention, the power supply apparatus of the first or second aspect further comprises switching control means capable of changing an ON/OFF frequency of the first and second switching devices.

According to the sixth aspect of the present invention, in the power supply apparatus of the fifth aspect, the first and second switching devices are turned on/off at a relatively low frequency in a period corresponding to a small peak value of an output voltage from the rectification device, and are turned on/off at a relatively high frequency as the peak value increases.

According to the seventh aspect of the present invention, in the power supply apparatus of one of the first to sixth aspects, the second capacitor is connected to the other switching device and the inductor in a parallel connection form.

According to the eighth aspect of the present invention, in the power supply apparatus of one of the first to sixth aspects, the second capacitor is arranged between the output terminals of the rectification device.

According to the ninth aspect of the present invention, in the power supply apparatus of one of the first to sixth aspects, the second capacitor is arranged between at least one output terminal of the rectification device and the pair of switching devices, and a diode is connected in parallel with the second capacitor to have the same polarity as the output polarity of the rectification device.

In the present invention, the second capacitor may be constituted by two or more capacitors, and these capacitors may be respectively arranged between the positive and negative output terminals of the rectification device and the pair of switching devices. An element allowing a resonance current to pass is required between the output terminals of the rectification device. As such an element, a capacitor generally used to pass a high-frequency wave can be used, but a special element may be used.

According to the 10th aspect of the present invention, in the power supply apparatus of the fifth or sixth aspect, an impedance circuit whose impedance decreases with an increase in frequency is arranged in the output circuit.

According to the 11th aspect of the present invention, in the power supply apparatus of one of the 1st to 10th aspects, the output circuit is arranged between the output terminals of the inductor to supply power to the load, and a primary winding of a transformer is connected to a load in a series connection form, so that drive control of the first and second switching devices is performed by an output from a secondary winding of the transformer.

According to the 12th aspect of the present invention, the power supply apparatus of one of the 1st to 11th aspects further comprises a discharge lamp as a load.

According to the 13th aspect of the present invention, in the power supply apparatus of the 12th aspect, the ON period of the second switching device in a predetermined period in a starting operation of the discharge lamp is set to be longer than that in an ON period of the lamp.

According to the 14th aspect of the present invention, in the power supply apparatus of one of the 1st to 13th aspects, at least the discharge lamp as a load is mounted on an illumination fixture body.

According to the 15th aspect of the present invention, there is provided a power supply apparatus comprising a rectification device for rectifying an AC voltage and outputting a non-smoothed DC voltage, first and second switching devices which are connected to each other in a series connection form and alternately turned on/off to switch an output from the rectification device at a frequency higher than a frequency of an output from the rectification device, a first capacitor connected to the first switching device in a parallel connection form, the first capacitor being charged by an output from the rectification device via the second switching device in an ON period of the second switching device so as to perform a smoothing operation with respect to the frequency of the output from the rectification device, and discharging charges via the first switching device in an ON period of the first switching device, an inductor which is inserted between a node of the first and second switching devices and the first capacitor, and allows a charge current from the first capacitor to pass, a second capacitor for causing resonance together with the inductor in accordance with ON/OFF operations of the first and second switching devices, a control unit for controlling the ON period of the first switching device in accordance with a value of a discharge current discharged from the first capacitor and flowing in the first switching device so as to control a value of a resonance voltage generated by the inductor and the second capacitor, and an output circuit for obtaining a high-frequency output on the basis of the resonance caused by the inductor and the second capacitor.

According to the 16th aspect of the present invention, there is provided a power supply apparatus comprising a rectification device connected to an AC power source, first and second switching devices connected to each other in a series connection form between a pair of output terminals of the rectification device, and turned on/off at a frequency higher than an output frequency of the rectification device, a series circuit of a first capacitor having a relatively large capacitance and an inductor, the series circuit being connected to the first switching device in a parallel connection form, a second capacitor having a relatively small capacitance and arranged to form a resonance circuit together with the inductor in accordance with ON/OFF operations of the first and second switching devices, a control unit which has current detection means for detecting a current flowing in the first switching device, and controls an ON period of the first switching device in accordance with a detection signal from the current detection means, and an output circuit for obtaining a high-frequency output on the basis of resonance caused by the inductor and the second capacitor.

The first capacitor in the present invention also performs a smoothing operation with respect to the output frequency of the rectification device. In addition, the second capacitor is arranged to form a resonance circuit together with the inductor. In this case, similar to the 19th aspect, the second capacitor may be arranged at any position as long as a resonance circuit can be formed.

According to the 17th aspect of the present invention, in the power supply apparatus of the 15th or 16th aspect, the control unit controls the ON period of the first switching device such that a peak value of a discharge current discharged from the first capacitor and flowing in the first switching device becomes a predetermined value.

According to the 18th aspect of the present invention, in the power supply apparatus of the 15th or 16th aspect, the control unit controls the ON period of the first switching device such that an integral value of a discharge current discharged from the first capacitor via the inductor and the first switching device becomes a predetermined value.

In the present invention, a discharge current value from the first capacitor rises in accordance with a slope determined by the voltage of the first capacitor, the inductor, and the impedance of the load. For this reason, by controlling the integral value of the discharge current to a predetermined value, the current value in the first switching device during an OFF period can be managed. In the present invention, as a means for controlling the integral value to the predetermined value, for example, a saturable current transformer is used. This control can be performed by keeping the first switching device in an ON state until the saturable current transformer is saturated. However, this means may be constituted by a current detection means and an integration means for integrating an output from the current detection means. Alternatively, a period of time during which a discharge current flows to the first switching device may be detected.

According to the 19th aspect of the present invention, in the power supply apparatus of the 15th aspect, the control unit controls the ON period of the first switching device such that an initial value of a resonance current flowing in the second switching device becomes a predetermined value.

According to the 20th aspect of the present invention, in the power supply apparatus of one of the 17th to 19th aspects, the control unit changes a predetermined value of a current value for determining the ON period of the first switching device in accordance with voltage values across the first and second switching devices.

According to the 21st aspect of the present invention, in the power supply apparatus of one of the 15th to 19th aspects, the control unit turns off the second switching device after a current flows therein for a predetermined period of time.

According to the 22nd aspect of the present invention, in the power supply apparatus of one of the 15th to 19th aspects, the control unit turns off the second switching device a predetermined period of time after a peak portion of a resonance current generated by the inductor and the second capacitor flows in the second switching device.

According to the 23rd aspect of the present invention, in the power supply apparatus of one of the 15th to 19th aspects, the control unit turns off the second switching device after at least one of input and output currents flows in the rectification device for a predetermined period of time.

In the 21st to 23rd aspects of the present invention, "a predetermined period of time" may be detected by detecting a time or the integral value of a current. In addition, the predetermined period of time may be changed in accordance with the AC voltage, the output voltage from the rectification device, the output voltage from the output circuit, or the like.

According to the 24th aspect of the present invention, in the power supply apparatus of one of the 15th to 19th aspects, the control unit controls the ON period of the second switching device in accordance with a voltage value corresponding to a voltage across the first capacitor.

In this case, "in accordance with a voltage value corresponding to a voltage across the first capacitor" means that control can be performed not only in accordance with the voltage across the first capacitor directly but also in accordance with the voltage across the first capacitor indirectly, e.g., in accordance with the voltages across the first and second capacitors.

According to the 25th aspect of the present invention, in the power supply apparatus of one of the 15th to 19th aspects, the control unit controls the ON period of the second switching device in accordance with an AC voltage value.

According to the 26th aspect of the present invention, in the power supply apparatus of one of the 15th to 19th aspects, the control unit controls the ON period of the second switching device in accordance with an output from the output circuit.

In the present invention, "an output from the output circuit" means output power, a voltage, or a current. In addition, if a discharge lamp is connected as a load, the power, lamp voltage, or lamp current of this discharge lamp may be used.

According to the 27th aspect of the present invention, the power supply apparatus of one of the 15th to 26th aspects further comprises a discharge lamp as a load.

According to the 28th aspect of the present invention, the power supply apparatus of the 27th aspect is provided as a discharge lamp lighting apparatus wherein the discharge lamp as the load is mounted on an illumination fixture body.

According to the 29th aspect of the present invention, there is provided a power supply apparatus comprising first and second switching elements connected in series with an output side of rectification means, a circuit constituted by smoothing capacitor means having a relatively large capacitance and induction means to which a load is connected, the circuit being connected in series with one of the first and second switching elements, and resonance capacitor means, having a capacitance smaller than that of the smoothing capacitor means, for forming a resonance system in cooperation with the induction means.

In the power supply apparatuses according to the first or second aspect, a non-smoothed DC voltage from the rectification device is smoothed by the first capacitor. In addition, by using the effect of a resonance voltage generated by a resonance circuit formed by the second capacitor and the inductor, the voltage of the first capacitor is set to be lower than the non-smoothed DC voltage rectified by the rectification device during a period of switching of the pair of switching devices. With this operation, an input current is ensured even in a period in which the peak value of a voltage from the AC power source (rectified non-smoothed DC voltage) is low, thereby improving the input power factor, attaining a reduction in input current distortion, and reducing the harmonic waves of the input current.

In addition, in the power supply apparatus according to the third aspect, the first and second switching devices are turned on/off at a substantially constant frequency, and the ratio of the ON periods of these switching devices can be changed. By changing the ON periods, the resonance amplitude can be changed, and the output voltage can be adjusted. Furthermore, since the switching frequency is substantially constant, an increase in switching loss can be suppressed as compared with an apparatus in which the switching frequency is increased.

In addition, in the power supply apparatus according to the fourth aspect, the ratio of the ON periods of the first and second switching devices can be changed. The ON period of the other switching device is shortened when the peak value of a voltage output from the AC power source every half cycle is large, and vice versa. By changing the ratio of the ON periods, the output voltage can be adjusted as in the fourth aspect. Furthermore, a sufficiently smoothed output voltage can be obtained by changing the ON period of one switching device in accordance with the peak value of an voltage output from the AC power source every half cycle.

In the power supply apparatuses according to the fifth and seventh aspects, by changing the switching frequency, the absolute ON period of the other switching device can be changed, and the output can be changed, as is apparent from the above description.

In the power supply apparatus according to the seventh aspect, since the second capacitor is connected to the other switching device and the inductor in a parallel connection form, the object can be achieved with a simple arrangement.

In the power supply apparatus according to the eighth aspect, since the second capacitor is connected between the output terminals of the rectification device, the object can be achieved with a simple arrangement, similar to the apparatus according to the seventh aspect.

In the power supply apparatus according to the ninth aspect, since the second capacitor is connected between the rectification device and the pair of switching devices, the object can be achieved with a simple arrangement, similar to the apparatus according to the seventh aspect.

In the power supply apparatus according to the 10th aspect, the output circuit includes the impedance circuit whose impedance decreases with an increase in frequency. Even if, therefore, the oscillation frequency is increased, the impedance of a route for realizing a reduction in distortion can be kept low, and a sufficient resonance current can be obtained.

In the power supply apparatus according to the 11th aspect, since the drive transformer stops the oscillation of the first and second switching devices upon removal of a load, an increase in stress on the first and second switching devices can be prevented.

In the power supply apparatus as a discharge lamp lighting apparatus according to the 12th aspect, since a discharge lamp as a load is used, the pulsation of an output can be reduced, and the luminous efficacy can be improved, thereby reducing the light ripple.

In the power supply apparatus as a discharge lamp lighting apparatus according to the 13th aspect, since the ON period of the other switching device in a predetermined period in a starting operation of the discharge lamp is set to be shorter than that in the lamp ON period, the discharge lamp is started after the filaments are sufficiently preheated. Therefore, shortening of the service life of the discharge lamp can be prevented.

In the power supply apparatus as an illumination apparatus according to the 14th aspect, since a discharge lamp lighting apparatus is mounted on the fixture body, the luminous efficacy is improved, and the pulsation of a lamp current can be reduced, thereby attaining a reduction in light ripple.

In the power supply apparatuses according to the 15th and 16th aspects, the first capacitor is charged by an output from the rectification device, and a smoothed DC voltage having a value smaller than the peak value of a non-smoothed DC voltage is held. In addition, a resonance circuit formed by the second capacitor and the inductor generates a resonance voltage in accordance with switching of the first and second switching devices. This resonance voltage acts to form a period in which the load voltage viewed from the rectification device is lower than the non-smoothed DC voltage throughout substantially the entire period of one cycle of the non-smoothed DC voltage. With this operation, an input current from the AC power source is ensured (a charge current flows in the first capacitor) even in a period in which the peak value of the non-smoothed DC voltage is low, thereby improving the input power factor, attaining a reduction in input current distortion, and reducing the harmonic waves of the input current. In addition, the resonance voltage is controlled by controlling the ON period of the first switching device in accordance with the value of a discharge current discharged from the first capacitor and flowing in the first switching device. For example, the ON period of the first switching device, which determines the magnitude of a resonance voltage, is controlled such that the peak value of a current flowing in the first switching device becomes a predetermined value. With this operation, as described with reference to FIGS. 23A and 23B, the resonance voltage value is controlled to be constant. As a result, the values of voltages applied to the pair of switching devices can be controlled to prevent breakdown of the switching devices, thereby allowing the use of switching devices having relatively low breakdown voltages.

Furthermore, by changing the predetermined value for determining the ON period, the output voltage value can be arbitrarily changed, and the changed voltage value can be made constant.

In the power supply apparatus according to the 17th aspect, since the ON period of the first switching device is controlled such that the peak value of a current flowing in the first switching device becomes a predetermined value, the same effects as those of the 15th and 16th aspects can be obtained.

In the power supply apparatus according to the 18th aspect, the ON period of the first switching device is controlled such that the integral value of a discharge current becomes a predetermined value. With this operation, substantially the same effects as those of the 17th aspect can be obtained.

In the power supply apparatus according to the 19th aspect, the ON period of the first switching device is controlled such that the initial value of a resonance current flowing in the second switching device becomes a predetermined value. Therefore, in this case as well, a current flowing into the resonance circuit, which determines a resonance voltage, can be made constant to control the resonance voltage value to be constant. In the present invention, control is based on the value of a discharge current flowing previously in the first switching device, and hence is performed with a delay. If, however, this delay is shortened to, e.g., one cycle of a high-frequency wave, no practical problems are posed.

In the power supply apparatus according to the 20th aspect, the value of a current flowing in the first switching device, which determines the ON period of the first switching device, is changed in accordance with the voltage values across the first and second switching devices. For example, the detected current or a reference signal to be compared with this detected current is changed. With this operation, the voltage values across the first and second switching devices can be made constant.

In the power supply apparatus according to the 21st aspect, since the second switching device is turned off after a current flows therein for a predetermined period of time, a charge current reliably flows from the rectification device to the first capacitor. Therefore, a reduction in input current distortion can be attained.

In the power supply apparatus according to the 22nd aspect, since the second switching device is turned off a predetermined period of time after a peak portion of a resonance current flows, a charge current reliably flows from the rectification device to the first capacitor the predetermined period of time after the peak portion flows. Therefore, the same effects as those of the 21st aspect can be obtained.

In the power supply apparatus according to the 23rd aspect, since an input/output current flows in the rectification device for a predetermined period of time, the same effects as those of the 21st and 22nd aspects can be obtained.

In the power supply apparatus according to the 24th aspect, in addition to the operations in the 15th to 19th aspects, the ON period of the second switching device is controlled in accordance with a voltage value corresponding to the voltage across the first capacitor so as to control the charge amount of the first capacitor. Therefore, the voltage across the first capacitor can be made constant. With this operation, even if the power source voltage varies, the voltage across the first capacitor can be made constant, and the voltage applied to the load can also be made constant.

In the power supply apparatus according to the 25th aspect, since the ON period of the second switching device is controlled in accordance with an AC power source voltage, the voltage across the first capacitor can be made constant by controlling the charge amount of the first capacitor. With this operation, even if the power source voltage varies, the voltage across the first capacitor can be made constant, and the voltage applied to the load can also be made constant.

In the power supply apparatus according to the 26th aspect, the charge amount of the first capacitor is controlled by controlling the ON period of the second switching device in accordance with an output from the output circuit, thereby making the voltage across the first capacitor constant. With this operation, even if the load varies, the voltage across the first capacitor can be made constant, and the voltage applied to the load can also be made constant.

In the power supply apparatus as a discharge lamp lighting apparatus according to the 27th aspect, a discharge lamp is used as a load. Therefore, in addition to the effects of the power source apparatus, the pulsation of the output is reduced, the luminous efficacy is improved, and the light ripple is reduced.

In the power supply apparatus as an illumination apparatus according to the 28th aspect, since the discharge lamp lighting apparatus is arranged in the apparatus boy, the luminous efficacy is improved, and the light ripple is reduced.

In the power supply apparatus according to the 29th aspect, a high-frequency voltage generated by the resonance system of the resonance capacitor means and the induction means is formed in an AC voltage rectified by the rectification means. With this operation, the rectified output voltage is made equal to the input voltage to ensure an input current even in a period in which the AC voltage is low, thereby attaining reductions in the distortion and harmonic components of the input current.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a circuit diagram showing the first embodiment of the present invention;

FIG. 2 is a perspective view showing an application of the present invention to an illumination apparatus;

FIG. 5 is a graph showing changes in the ON periods of switching devices in FIG. 4;

FIGS. 6A to 6E are equivalent circuit diagrams showing the operation of the embodiment shown in FIG. 4;

FIG. 7 is a timing chart showing the waveforms of voltages and currents at the respective components to show the effects of the embodiment shown in FIG. 4 in a case wherein the ON period of the second switching device is set to be relatively short;

FIG. 8 is a timing chart showing the waveforms of voltages and currents at the respective components to show the effects of the embodiment shown in FIG. 4 in a case wherein the ON period of the second switching device is set to be relatively long;

FIG. 9 is a timing chart showing the waveforms of voltages and currents at the respective components to show the effects of the embodiment shown in FIG. 4 in a case wherein the ON period of the second switching device is further shortened;

FIG. 10 is a circuit diagram showing the third embodiment of the present invention;

FIG. 11 is a circuit diagram showing the fourth embodiment of the present invention;

FIG. 12 is a graph for explaining the effects of the embodiment shown in FIG. 11;

FIG. 13 is a circuit diagram showing the fifth embodiment of the present invention;

FIG. 14 is a timing chart for explaining the sixth embodiment of the present invention;

FIG. 15 is a circuit diagram showing the seventh embodiment of the present invention;

FIG. 16 is a circuit diagram showing the eighth embodiment of the present invention;

FIG. 17 is a circuit diagram showing the ninth embodiment of the present invention;

FIG. 18 is a circuit diagram showing the 10th embodiment of the present invention;

FIGS. 21A to 21E are equivalent circuit diagrams showing the operation of the embodiment shown in FIG. 20;

FIGS. 22A and 22B are timing charts showing the effects of the embodiment shown in FIG. 20;

FIGS. 23A and 23B are timing charts showing the effects of the embodiment shown in FIG. 20;

FIGS. 24A to 24C are timing charts showing the effects of the embodiment shown in FIG. 20;

FIGS. 25A to 25C are timing charts showing the effects of the embodiment shown in FIG. 20;

FIG. 26 is a circuit diagram showing the 13th embodiment of the present invention;

FIG. 27 is a circuit diagram showing the 14th embodiment of the present invention;

FIG. 28 is a perspective view schematically showing an application of the present invention to an illumination apparatus;

FIGS. 30A to 30C are timing charts showing the waveforms of a voltage across a second capacitor and currents in the respective switching devices in a case wherein the ON period of the second switching device in FIG. 29 is relatively short;

FIGS. 31A to 31C are timing charts showing the waveforms of a voltage across the second capacitor and currents in the respective switching devices in a case wherein the ON period of the second switching device in FIG. 29 is relatively long;

FIG. 32 is a timing chart showing a voltage between the output terminals of the rectification device in FIG. 29;

FIG. 33 is a timing chart showing a load current in FIG. 29;

FIG. 36 is a timing chart showing the waveform of a current in the second switching device in a case wherein the voltage between the output terminals of the rectification device becomes relatively high;

FIG. 37 is a timing chart showing the waveform of a current in the second switching device in a case wherein the voltage between the output terminals of the rectification device becomes relatively low;

FIG. 40 is a circuit diagram showing the 19th embodiment of the present invention;

FIG. 41 is a circuit diagram showing the 20th embodiment of the present invention;

FIG. 42 is a circuit diagram showing the 21st embodiment of the present invention;

FIG. 43 is a circuit diagram showing the 22nd embodiment of the present invention;

FIG. 44 is a circuit diagram showing the 23rd embodiment of the present invention;

FIG. 45 is a timing chart showing the waveform of a current in a second switching device in FIG. 44;

FIGS. 47A to 47C are timing charts showing the waveforms of currents in first and second switching devices in FIG. 46;

FIG. 48 is a perspective view showing an application of an improved power source apparatus of the present invention to an illumination apparatus;

DETAILED DESCRIPTION OF THE PREFERRED EMBODIMENTS

Figure 3A:
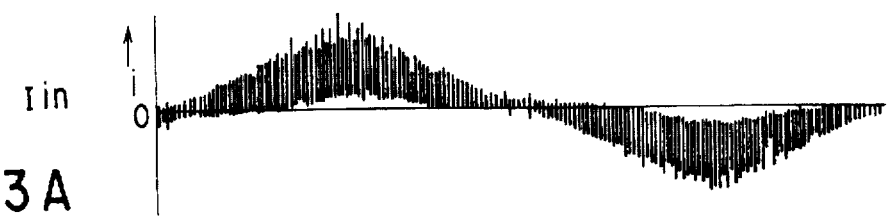
FIGS. 3A to 3C are timing charts showing the waveforms of currents and a voltage at the respective components to show the effects of the embodiment shown in FIG. 1.

The first embodiment in which a power supply apparatus of the present invention is applied to a discharge lamp lighting apparatus and an illumination apparatus will be described below with reference to FIGS. 1 to 3.

As shown in FIG. 2, lamp sockets 12 are attached to the two terminals of a fixture body 11 having a reflecting surface formed on its lower surface. A load, i.e., a fluorescent lamp FL as a discharge lamp, is mounted between the lamp sockets 12. A discharge lamp lighting circuit 16 shown in FIG. 1 is arranged in the fixture body 11.

A filter circuit 21 constituted by a coil L1 and a capacitor C1 is connected to a commercial AC power source E of the discharge lamp lighting circuit 16. A full-wave rectifier 22 as a high-speed switching rectification means such as a diode bridge is connected to the filter circuit 21. First and second switching elements Q1 and Q2 constituting a half-bridge type inverter circuit 23 are connected in series between the output terminals of the full-wave rectifier 22. A reflux diode D1 and a diode D2 are connected in parallel with the first and second switching elements Q1 and Q2.

A series circuit of a primary winding Tr1a of leakage type isolating transformer Tr1 as an induction means and a smoothing capacitor C2 having a relatively large capacitance and serving as a smoothing capacitor means is connected in parallel with the first switching element Q1 so as to form a circuit 24. Note that the smoothing capacitor C2 exhibits a smoothing effect with respect to the power source frequency of the commercial AC power source E.

Filaments FL1 and FL2 of the fluorescent lamp FL are connected to a secondary winding Tr1b of the isolating transformer Tr1. A capacitor C3 for preheating filaments is connected between the filaments FL1 and FL2.

A resonance capacitor C4 having a relatively small capacitance and serving as a resonance capacitor means is connected to the second switching element Q2 via the primary winding Tr1a of the isolating transformer Tr1. Note that the resonance capacitor C4 is extremely smaller in capacitance than the smoothing capacitor C2, and serves to generate an oscillating waveform at the switching frequency of the first and second switching elements Q1 and Q2 in cooperation with the inductance of the isolating transformer Tr1.

The operation of the embodiment shown in FIG. 1 will be described next.

First of all, noise is removed from a voltage from the commercial AC power source E by the filter circuit 21. The voltage is then subjected to full-wave rectification in the full-wave rectifier 22. The first and second switching elements Q1 and Q2 are alternately switched at a high frequency higher than the power source frequency to induce a high-frequency AC voltage in the secondary winding Tr1b of the isolating transformer Tr1, thereby performing high-frequency lighting of the fluorescent lamp FL. In addition, resonance is caused by the resonance capacitor C4 and the primary winding Tr1a of the isolating transformer Tr1 to supply a power factor improving current in a period corresponding to a low-level portion of the AC voltage rectified by the full-wave rectifier 22, thereby attaining a reduction in distortion.

More specifically, when the first switching element Q1 is turned on, a current flows in a closed circuit of the smoothing capacitor C2, the first switching element Q1, the primary winding Tr1a of the isolating transformer Tr1, and the smoothing capacitor C2. As a result, the primary winding Tr1a of the isolating transformer Tr1 is charged.

Subsequently, when the first switching element Q1 is turned off, the charges in the primary winding Tr1a of the isolating transformer Tr1 are discharged through a closed circuit of the resonance capacitor C4, the diode D2, and the primary winding Tr1a of the isolating transformer Tr1. At this time, the voltage of the resonance capacitor C4 rises by resonance of the resonance capacitor C4 and the primary winding Tr1a of the isolating transformer Tr1.

When the second switching element Q2 is turned on, a current flows in a closed circuit of the resonance capacitor C4, the primary winding Tr1a of the isolating transformer Tr1, the second switching element Q2, and the resonance capacitor C4. As a result, the primary winding Tr1a of the isolating transformer Tr1 is charged. At this time, the voltage of the resonance capacitor C4 drops.

When the voltage of the resonance capacitor C4 drops, and the voltage of the resonance capacitor C4 and the smoothing capacitor C2 becomes equal to the input voltage, a current flows in the full-wave rectifier 22. As a result, a power factor improving current flows in a closed circuit of the full-wave rectifier 22, the smoothing capacitor C2, the primary winding Tr1a of the isolating transformer Tr1, the second switching element Q2, and the full-wave rectifier 22, thereby attaining a reduction in distortion.

When the second switching element Q2 is turned off, the energy stored in the primary winding Tr1a of the isolating transformer Tr1 is discharged through a closed circuit of the diode D1, the smoothing capacitor C2, and the primary winding Tr1a of the isolating transformer Tr1. As a result, the energy is charged in the smoothing capacitor C2.

Figure 3B:
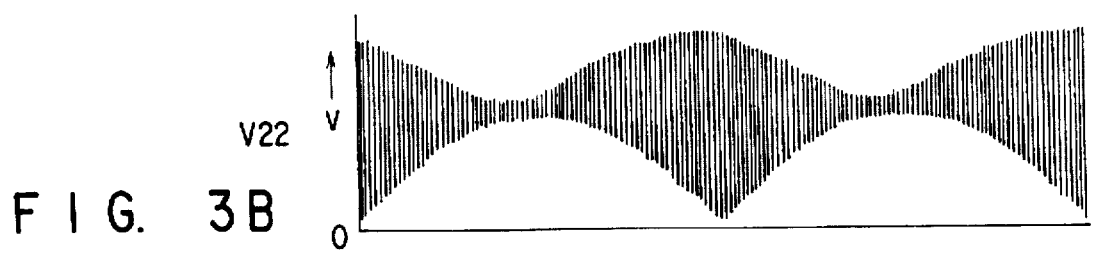
Figure 3C:
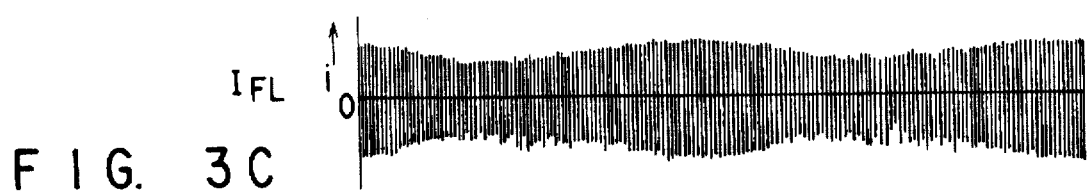

When an experiment is conducted by using the embodiment shown in FIG. 1, a current and voltages are obtained, as shown in FIGS. 3A to 3B. FIG. 3A shows an input current Iin; FIG. 3B, an output voltage V22 from the full-wave rectifier 22; and FIG. 3C, the voltage of the fluorescent lamp FL. That is, a reduction in output ripple can be attained.

In addition, an inrush current flowing to the smoothing capacitor C2 upon power-ON operation is reduced by the primary winding Tr1a of the isolating transformer Tr1 and the second switching element Q2.

Furthermore, the same effects as described above can be obtained even if the smoothing capacitor C2 and the resonance capacitor C4 are connected to replace each other.

Other embodiments of the present invention will be described next with reference to the accompanying drawings.

Figure 4:
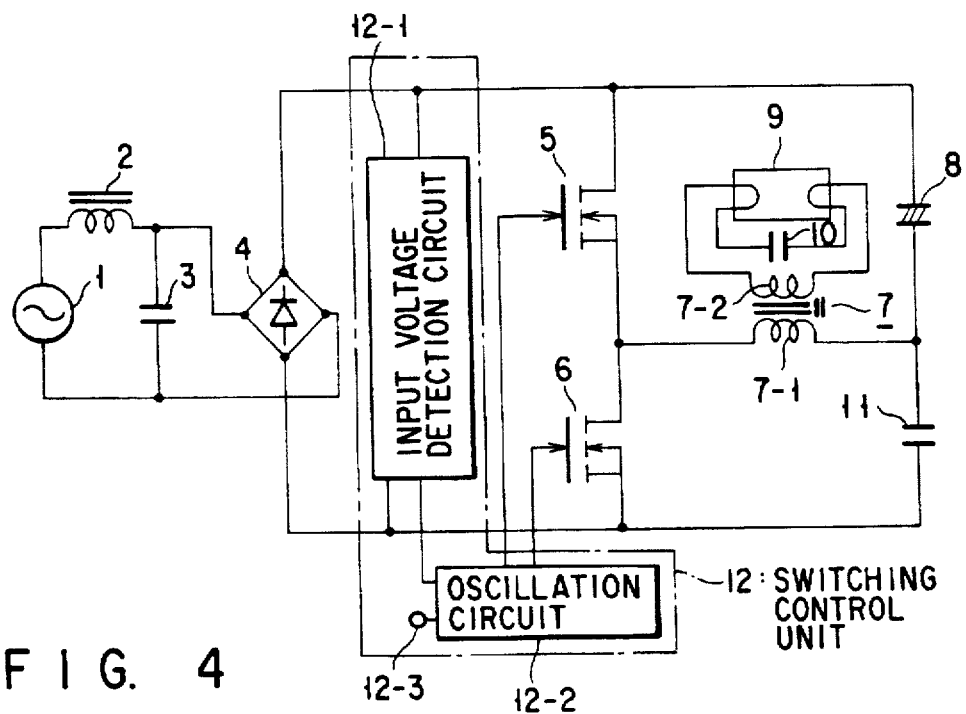
FIG. 4 is a circuit diagram showing the second embodiment of the present invention.

The second embodiment of the present invention will be described with reference to FIGS. 4 to 9. Referring to FIG. 4, for example, a filter circuit constituted by a choke coil 2 and a capacitor 3 is connected to a commercial AC power source 1. A full-wave rectifier as a rectification device 4 constituted by, e.g., a diode bridge, is connected to this filter circuit. The rectification device 4 (diode bridge) is constituted by, e.g., a high-speed switching diode. First and second switching devices 5 and 6 are connected in series between a pair of output terminals of the rectification device 4. In this embodiment, these switching devices 5 and 6 are constituted by field-effect transistors and use parasitic diodes as diodes allowing reverse currents to pass.

A series circuit of a primary winding 7-1 of a leakage type isolating transformer as an inductor 7 and a smoothing capacitor having a relatively large capacitor and serving as a first capacitor 8 is connected to one of the switching devices, i.e., the first switching device 5 in this embodiment, in a parallel connection form. Note that the first capacitor 8 exhibits a smoothing effect with respect to the power source frequency of the commercial AC power source 1.

In this embodiment, an output circuit is formed at two terminals of the inductor 7. That is, a secondary winding 7-2 of the inductor 7 serves as an output circuit. A discharge lamp as a load, e.g., a fluorescent lamp 9, is connected to the secondary winding 7-2. A capacitor 10 for preheating filaments is connected between the filaments of the fluorescent lamp 9. In the embodiment, the leakage inductance of the inductor 7 also serves as a current-limiting inductance for the fluorescent lamp 9.

A resonance capacitor having a relatively small capacitor and serving as a second capacitor 11 is connected to the other switching device, i.e., the second switching device 6 in a parallel connection form in this embodiment, via the primary winding 7-1 of the inductor 7. Note that the second capacitor 11 is extremely smaller in capacitance than the first capacitor 8, and serves to generate an oscillating waveform at the switching frequency of the first and second switching devices 5 and 6 in cooperation with the inductance of the inductor 7.

Furthermore, in this embodiment, a switching control unit 12 is arranged to control the ON/OFF operations of the switching devices 5 and 6. The switching control unit 12 turns on/off the switching devices 5 and 6 at a substantially constant frequency. In addition, the switching control unit 12 can change the ON period of the switching device 6 in accordance with the peak value of an output voltage from the AC power source 1 (output voltage from the rectification device 4), as indicated by the relationship shown in FIG. 5. More specifically, when the peak value of an output voltage from the AC power source 1 (output voltage from the rectification device 4) is large, the switching control unit 12 decreases the ON period, and vice versa. Therefore, the ON period of the first switching device 5 changes reversely with respect to the second switching device 6. Furthermore, in this embodiment, the ON period of the second switching device 6 can also be changed in accordance with an external signal. More specifically, the switching control unit 12 is constituted by a detection circuit 12-1 for detecting an input voltage, and an oscillation circuit 12-2 for changing the ON period in accordance with the voltage detected by the detection circuit 12-1. As the oscillation circuit 12-2, for example, an IC as a PWM controller (e.g., TL494 available from Texas Instruments) can be used. The switching control unit 12 also includes an external control signal input section 12-3.

The effects of this embodiment will be described next. The overall operation of the apparatus will be described briefly. First of all, noise is removed from a voltage from the commercial AC power source 1 by the filter circuit. The voltage is then subjected to full-wave rectification in the rectification device 4. Meanwhile, the first and second switching devices 5 and 6 are alternately switched at a frequency higher than the power source frequency to induce a high-frequency AC voltage in the secondary winding 7-2 of the inductor 7, thereby performing high-frequency lighting of the fluorescent lamp 9. In addition, a resonance voltage is generated by the second capacitor 11 and the inductor 7. With the effect of this resonance voltage, a power factor improving current is supplied even in a period in which the peak value of the voltage rectified by the rectification device 4 is small, thereby attaining a reduction in distortion.

The circuit operation will be described in detail next with reference to FIGS. 6A to 9. Note that FIGS. 6A to 6E schematically show only the main part required to explain the circuit operation. The same reference numerals in FIGS. 6A to 6E denote the same parts as in FIG. 4. FIGS. 7 to 9 show voltage and current waveforms at the respective components. Referring to FIGS. 7 to 9, reference symbol V denotes a voltage; and I, a current, and the respective suffixes denote the corresponding parts in FIG. 4 (However, "VGS5" in FIGS. 7, 8, and 9 represents the gate-source voltage of the first switching device 5; and "VGS6", the gate-source voltage of the second switching device 6).

A period in which the peak value of an AC power source voltage (non-smoothed DC voltage) is large will be described first with reference to FIGS. 6A to 6E and 7. In a period in which the peak value is large, the switching control unit 12 controls the second switching device 6 in accordance with the detected voltage so as to set the ON period to be relatively short.

In a period (a) (FIG. 6A and "(a)" in FIG. 7), since a closed circuit of the first capacitor 8, the first switching device 5, and the inductor 7 is formed, the charges stored in the first capacitor 8 are discharged through the closed circuit, and currents I5 and I8 flow as shown in FIG. 7.

In a period (b) (FIG. 6B and "(b)" in FIG. 7), the first switching device 5 is turned off, and the parasitic diode of the second switching device 6 is turned on. As a result, the inductor 7 and the second capacitor 11 cause series resonance, and resonance currents I6 and I11 flow as shown in FIG. 7. With this operation, resonance voltages V11 and V7 appear in the second capacitor 11 and the inductor 7 as shown in FIG. 7. In addition, a resonance voltage V4 appears across the rectification device 4, which is equal to the sum of the voltages of the second capacitor 11 and the first capacitor 8.

In a period (c) (FIG. 6C and "(c)" in FIG. 7), the second switching device 6 is turned on, and the polarities of resonance currents are reversed. As a result, resonance currents I6 and I11 reverse to those in FIG. 6B flow. Since the resistive component of the resonance circuit is small, the resonance voltages V7 and V11 in the periods (b) and (c) become higher than the rectified ripple voltage. That is, the resonance voltages are boosted.

In a period (d) (FIG. 6D and "(d)" in FIG. 7), the resonance voltages drop, and the voltages across the second capacitor 11 and the first capacitor 8 also tend to drop. As a result, currents I4, I8, and I6 flow from the rectification device 4 via the first capacitor 8, the inductor 7, and the second switching device 6, as shown in FIG. 7.

In a period (e) (FIG. 6E and "(e)" in FIG. 7), the second switching device 6 is turned off, and the parasitic diode of the first switching device 5 is turned on, so that currents I5 and I8 flow in the parasitic diode of the first switching device 5 and the first capacitor 8 owing to the energy stored in the inductor 7, as shown in FIG. 7. Thereafter, the state in the period (a) is restored.

A period in which the peak value of an AC power source voltage is small will be described next with reference to FIG. 8. In this period, the switching control unit 12 detects a voltage, and performs control such that the ON period of the second switching device 6 becomes relatively long. The circuit operation in this case is basically the same as in the case shown in FIGS. 6A to 6E. FIG. 8 shows voltage and current waveforms at the respective components. It should be noted in the case shown in FIG. 8 that the amplitudes and peak values of the resonance voltages V4 and V11 are larger than those in the case shown in FIG. 7. This is because the ON period is long, and the periods (b) and (c) are relatively prolonged. This is because in a period in which the peak value of the non-smoothed DC voltage is small, the voltage charged in the second capacitor 11 becomes low in accordance with the peak value, and a current flowing into the second capacitor 11, i.e., the initial resonance current value in the period (b), increases accordingly. Therefore, in a period in which the peak value of a non-smoothed DC voltage becomes small, the voltage can be boosted more, and the valleys of the non-smoothed DC voltage can be raised. As described above, in the circuit shown in FIG. 4, the ON periods of the switching devices 5 and 6 are controlled according to the relationship shown in FIG. 5. For this reason, in a period in which the peak value is small, the ON period of the first switching device 5 is relatively short. With this arrangement, a current flowing in the switching device 5 is blocked in a stage in which the current value is relatively small. This makes the initial resonance current value in the period (b) small. As described above, therefore, the voltage values of the valleys are not excessively increased by an extreme boosting operation, even though the resonance voltage increases owing to the relationship with the voltage charged in the second capacitor 11.

When an experiment was conducted by using the embodiment shown in FIG. 4, the input current Iin from the AC power source 1 exhibited the waveform shown in FIG. 3A. As described above, this indicates that a current from the rectification device 4 in the period (d) flows throughout the entire period of a non-smoothed DC voltage from the rectification device 4. It is, therefore, understood that this current improves the input power factor and contributes to a reduction in the distortion of an input current. In addition, the voltage V4 between the output terminals of the rectification device 4 exhibits the waveform shown in FIG. 3B, and the current in the fluorescent lamp 9 exhibits the waveform shown in FIG. 3C. That is, it is understood that a reduction in output ripple can be attained.

If the ON period of the second switching device 6 is controlled by an external signal, the output voltage can be changed. More specifically, when the ON period of the second switching device 6 is set to be relatively long, the output voltage becomes high, and vice versa. Therefore, as in this embodiment, when a discharge lamp is used as a load, dimming/lighting of the lamp can be arbitrarily performed. FIG. 9 shows voltage and current waveforms at the respective components in a case wherein the ON period is further shortened.

An inrush current to the first capacitor 8 upon power-ON operation can be reduced by connecting the inductor 7 in series with the first capacitor 8, and ON/OFF-operating the second switching device 6 at a high frequency.

The same effects as described above can be obtained even if the connecting positions of the first and second capacitors 8 and 11 are changed to replace each other. In this case, the switching device for controlling the ON period is also connected reversely.

FIG. 10 is a circuit diagram showing the third embodiment of the present invention. In this embodiment, an isolating transformer having no special leakage inductance is used as an inductor 7', and an inductor 15 is connected in series with a primary winding 7'-2 of this isolating transformer. The same reference numerals in FIG. 10 denote the same parts as in FIG. 4, and a description thereof will be omitted. Note that the switching devices 5 and 6 are shown in simplified form. In the embodiment, the inductor 15 serves as a current-limiting impedance for a fluorescent lamp 9.

It is easily understood that with the arrangement shown in FIG. 10, the same effects as those of the embodiment shown in FIG. 4 can be obtained. Therefore, a description of the effects will be omitted.

FIG. 11 is a circuit diagram showing the fourth embodiment of the present invention. In this embodiment, an impedance circuit constituted by a coil 16 and a capacitor 17 is connected in parallel with the primary winding 7-1 of the isolating transformer as the inductor 7 in the embodiment shown in FIG. 4. Note that the characteristic impedance of this impedance circuit is minimized at a frequency fl, as shown in FIG. 12.

In this embodiment, as compared with the oscillation frequency in total lighting of the fluorescent lamp 9, the oscillation frequency of an inverter circuit is increased (within the range on the left side of "f1" in FIG. 12) in dimming/lighting of a fluorescent lamp 9 to decrease the output. As the oscillation frequency is increased, the ON period of a second switching device 6 is shortened. It is, therefore, understood from the description made with reference to FIGS. 8 and 9 that the output decreases.

In this case, since the characteristic impedance of the impedance circuit decreases with an increase in frequency, the impedance circuit changes from the state of an open electric circuit to be connected in parallel with the inductor 7. If the constant of the impedance circuit is set such that the resonance frequency of the resonance circuit increases as the impedance circuit is connected in parallel with the inductor 7, a period (see "(b)" in FIGS. 7 and 8) in which a current flows from a rectification device 4 after resonance can be ensured. Therefore, stop intervals of a current can be eliminated, and a reduction in distortion can be attained throughout periods from a total lighting period to a dimming/lighting period.

FIG. 13 is a circuit diagram showing the fifth embodiment of the present invention. In this embodiment, the first switching device in the embodiment shown in FIG. 4 is constituted, as a first switching device 5', by a bipolar transistor 5'-1 and a diode 5'-2 which are connected in parallel with each other, and the second switching device is constituted, as a second switching device 6', by a bipolar transistor 6'-1 and a diode 6'-2 which are connected in parallel with each other. A primary winding 18-1 of a drive transformer 18 is connected between a fluorescent lamp 9 and a secondary winding 7-2 of an isolating transformer as an inductor 7. A secondary winding 18-2 of the drive transformer 18 is connected between the base and emitter of the bipolar transistor 5'-1 of the first switching device 5'. A secondary winding 18-3 of the drive transformer 18 is connected between the base and emitter of the bipolar transistor 6'-1 of the second switching device 6'. With this arrangement, a base current is supplied to each of the switching devices 5' and 6'.

In this embodiment, when the fluorescent lamp 9 is removed to open the circuit, no current flows in the primary winding 18-1 of the drive transformer 18, and no outputs are output from the secondary windings 18-2 and 18-3 of the drive transformer 18. As a result, no base current flows in the switching devices 5' and 6', and the oscillation of a circuit as an inverter circuit is stopped.

Since the oscillation of the inverter circuit is stopped upon removal of the fluorescent lamp 9, the stresses acting on the first and second switching devices 5' and 6' can be reduced as compared with a case wherein switching is performed even in the absence of a load. In a non-load state, the resistive component of the resonance circuit is substantially zero. The kurtosis of the resonance circuit in this state is large, and the resonance voltages are also high. If, therefore, oscillation is continued for a long period of time in a non-load state, large resonance voltages are kept applied to the switching devices 5' and 6', leading to a deterioration or breakdown of the switching devices 5' and 6'.

If the first and second switching devices 5' and 6' are constituted by field-effect transistors, an output from each secondary winding is supplied to a corresponding gate-source path. Therefore, in this case, the same effects as described above can be obtained.

FIG. 14 is a timing chart showing the sixth embodiment of the present invention. In this embodiment, for example, the circuit arrangement of the embodiment shown in FIG. 4 is used. When a voltage from a commercial AC power source 1, which is indicated by "(a)" in FIG. 14, is low, oscillation of an inverter circuit is performed at a predetermined frequency f0 at which the input current becomes a predetermined current, as indicated by (b) in FIG. 14. When the voltage from the commercial AC power source 1 is high, FM modulation is performed to increase the frequency to that indicated by the broken or solid line. With this operation, the ON period of a second switching device is set to be shorter than that in the case of the frequency f0, and the output voltage from the inverter circuit is decreased, thereby setting a fluorescent lamp 9 in a dimmed state.

In this manner, the frequency is fixed when the output voltage from a rectification device 4 is low, and a condition is set in advance such that a stop interval of a current is not eliminated at this frequency, thereby supplying a power factor improving current. With this operation, a high power factor can be maintained, and a reduction in distortion can be attained.

A high-frequency ripple current waveform superposed on a power source voltage is determined by the resonance effect between the inductance of an inductor 7 and the capacitance of a second capacitor 11, but cannot be controlled by a first switching device 5 alone. That is, a period in which the voltages of a first capacitor 8 and the second capacitor 11 become lower than the input voltage of the rectification device 4 must be ensured in the ON period of a second switching device 6. This operation can be reliably performed.

The control shown in FIG. 14 can also applied to embodiments other than the embodiment shown in FIG. 4.

FIG. 15 is a circuit diagram showing the seventh embodiment of the present invention. In this embodiment, similar to the embodiment shown in FIG. 13, the first and second switching devices in the embodiment shown in FIG. 4 are mainly constituted, as first and second switching devices 5' and 6', by bipolar transistors, and a series circuit of a third capacitor 19 having a relatively large capacitance and a coil 20 as an impedance element and a fourth capacitor 21 having a relatively small capacitance are connected in parallel with each other in place of the first capacitor 8.

The third capacitor 19 requires a large capacitance to store energy for a smoothing operation. For this reason, an electrolytic capacitor is used as the third capacitor 19. If, however, a current having a large ripple flows in the electrolytic capacitor, the service life of the capacitor may be shortened. In this embodiment, therefore, the coil 20 serving as an impedance element is arranged to prevent a high-frequency current from flowing in the third capacitor 19 via the capacitor 21.

In this embodiment, therefore, a low-frequency component is smoothed by the series circuit of the third capacitor 19 and the coil 20, whereas a high-frequency ripple current is supplied to the fourth capacitor 21 to reduce the high-frequency ripple current flowing in the third capacitor 19.

Power supply to the inverter circuit is mainly performed by the fourth capacitor 21. When the voltage of the fourth capacitor 21 drops, the fourth capacitor 21 is charged from the third capacitor 19.

FIG. 16 is a circuit diagram showing the eighth embodiment of the present invention. In this embodiment, the second capacitor in the embodiment shown in FIG. 4 is modified. More specifically, the second capacitor is constituted by a series circuit of capacitors 22 and 23 and a switching element 24 as a capacitor changing means.

When a fluorescent lamp 9 is to be preheated and started, the switching element 24 is turned on, and the capacitor 23 is connected in parallel with the capacitor 22 to increase the synthetic capacitance. With this operation, the resonance frequency is decreased to prevent an overvoltage in a preheating/starting period, and suppress input current distortion in the preheating/starting period.

FIG. 17 is a circuit diagram showing the ninth embodiment of the present invention. In this embodiment, in place of the switching element 24 in the embodiment shown in FIG. 16, a diode 25 and a field-effect transistor 26 as a capacitor changing means are connected.

In this case, when the field-effect transistor 26 is turned off, the capacitor 23 cannot be charged. When the field-effect transistor 26 is turned on, a capacitor 23 can be charged. Note that the capacitor 23 can always be discharged by the diode 25. In this manner, the capacitance is decreased when only a capacitor 22 is used, and is increased when a parallel circuit of the capacitors 22 and 23 is used, thereby changing the capacitance.

This embodiment shown in FIG. 17 operates in the same manner as the embodiment shown in FIG. 16, and the same effects as those thereof can be obtained.

FIG. 18 is a circuit diagram showing the 10th embodiment of the present invention. In this embodiment, the resonance capacitor 22 and the capacitor 23 in the embodiment shown in FIG. 17 are connected in series.

In this case, when a field-effect transistor 26 is turned off, the capacitor 23 cannot be charged. When the field-effect transistor 26 is turned on, the capacitor 23 can be charged. Note that the capacitor 23 can always be discharged by a diode 25. In this manner, the capacitance is decreased when only the capacitor 22 is used, and is increased when a parallel circuit of the resonance capacitor 22 and the capacitor 23 is used, thereby substantially changing the capacitance.

This embodiment operates in the same manner as the embodiments shown in FIGS. 16 and 18, and the same effects as those thereof can be obtained.

Figure 19:
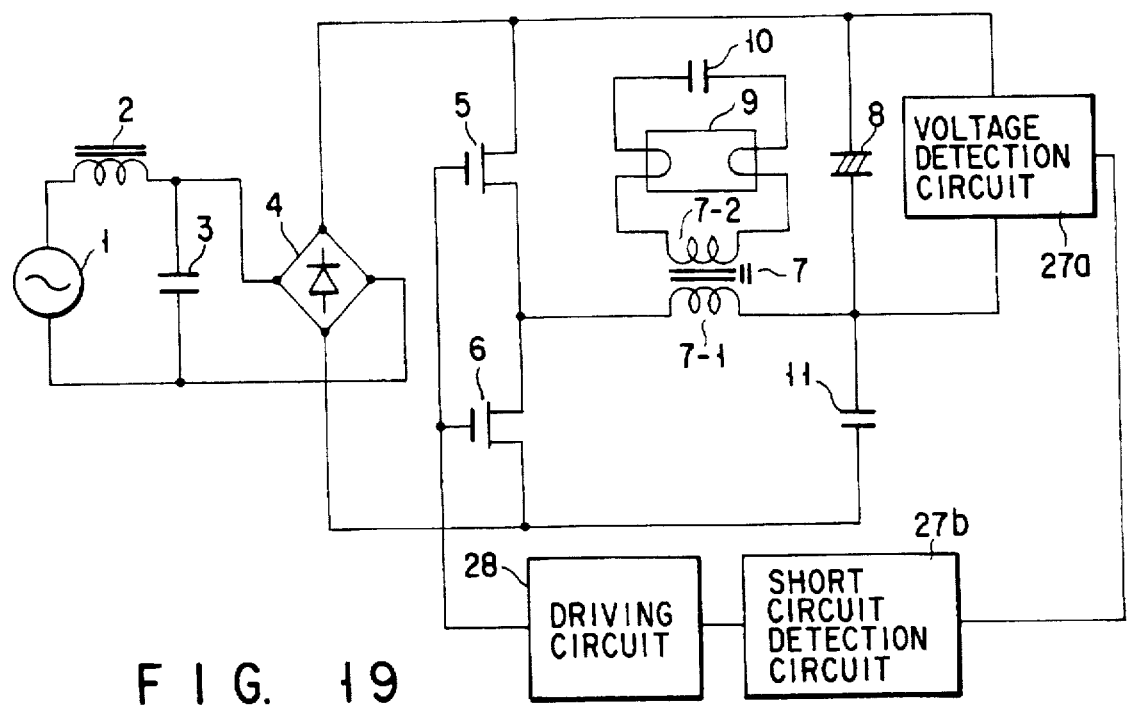
FIG. 19 is a circuit diagram showing the 11th embodiment of the present invention.

FIG. 19 is a circuit diagram showing the 11th embodiment of the present invention. This embodiment includes a short circuit detection circuit 27b as a means for detecting a short circuit on the basis of the output from a voltage detection circuit 27a for detecting the voltage of the first capacitor 8 in the embodiment shown in FIG. 4, and a driving circuit 28 for controlling oscillation of the first and second switching devices 5 and 6 on the basis of the operation of the short circuit detection circuit 27b.

When the voltage of the first capacitor 8 rises to a predetermined value or more, the short circuit detection circuit 27b determines that a fluorescent lamp 9 is removed, and stops oscillation of the first and second switching devices 5 and 6 through the driving circuit 28, thereby stopping oscillation of the inverter circuit.

By stopping oscillation of the inverter circuit upon removal of the fluorescent lamp 9 in this manner, application of stresses on the first and second switching devices 5 and 6 is prevented.

The voltage detection circuit 27a may detect the lamp current in the fluorescent lamp 9. When the lamp current becomes a predetermined value or more, e.g., a current in a primary winding 7-1 of an inductor 7 becomes a predetermined value or less, the voltage detection circuit 27a may determine that the fluorescent lamp 9 is removed.

In addition, the short circuit detection circuit 27b may detect the lamp voltage of the fluorescent lamp 9. When the lamp voltage becomes a predetermined value or more, the short circuit detection circuit 27b may determine that the fluorescent lamp 9 is removed.

Figure 20:
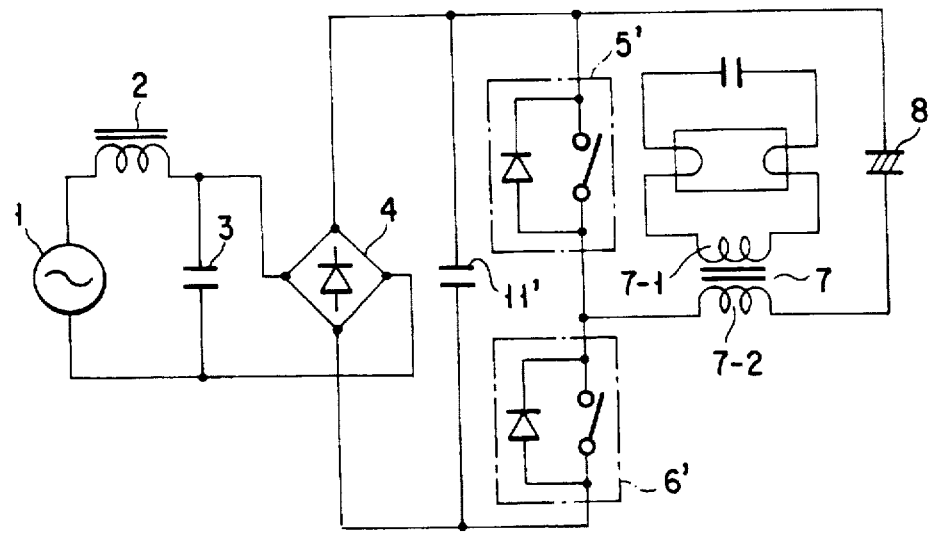
FIG. 20 is a circuit diagram showing the 12th embodiment of the present invention.

FIG. 20 is a circuit diagram showing the 12th embodiment of the present invention. In this embodiment, the second capacitor 11' is connected between the output terminals of the rectification device 4 in the embodiment shown in FIG. 4.

The effects of this embodiment will be described with reference to FIGS. 21A to 21E. FIGS. 21A to 21E correspond to FIGS. 6A to 6E and 7. In a period (a) (FIG. 21A), a current flows from a first capacitor 8 to a switching device 5' and a primary winding 7-1 of an inductor 7.

In a period (b) (FIG. 21B), a closed circuit of the primary winding 7-1 of the inductor 7, the first capacitor 8, the second capacitor 11', a parasitic diode 6'-2, and the primary winding 7-1 of the inductor 7 is formed. In this period, the inductor 7 and the second capacitor 11' cause series resonance. Since the capacitance of the first capacitor 8 is set to be extremely larger than that of the second capacitor 11', a resonance condition in this case is mainly determined by the inductance of the inductor 7 and the capacitance of the second capacitor 11'.

In a period (c) (FIG. 21C), when a switching device 6' is turned on, and the polarity of a resonance current is reversed, the resonance current flows in a reverse direction to that in the period (b).

In a period (d), when the voltage across the second capacitor 11' tends to drop to a voltage lower than the output voltage from the rectification device 4 owing to the resonance in the period (c), a current flows from the rectification device 4 to the circuit of the first capacitor 8, the primary winding 7-1 of the inductor 7, and the second switching device 6' to charge the first capacitor 8. At this time, as described above, since the capacitor of the first capacitor 8 is extremely larger than that of the second capacitor 11', almost no current flows in the second capacitor 11' owing to the relationship in impedance between the two capacitors.

In a period (e) (FIG. 21D), a current flows in a parasitic diode 5'-2 and the first capacitor 8 owing to the energy stored in the inductor 7. Thereafter, the state in the period (a) is restored.

As described above, the 12th embodiment operates in the same manner as the embodiment shown in FIG. 4, and a reduction in distortion and the like can be attained.

According to an experiment, as shown in FIG. 22B, the distortion of an input current Iin is reduced as compared with an input voltage Vin shown in FIG. 22A, and the pulsation of a lamp current IL shown in FIG. 23B is small as compared with an input voltage Vin shown in FIG. 23A.

In addition, a drain-source voltage VDS and a drain current ID of the second switching device 6' have waveforms like those shown in FIG. 24A. In the period (b) in which the output voltage from the rectification device 4 is high, the voltage VDS and the current ID have waveforms like those shown in FIG. 24B. In the period (c) in which the output voltage from the rectification device 4 is low, the voltage VDS and the current ID have waveforms like those shown in FIG. 24C.

Furthermore, an output voltage V4 and an output current 14 from the rectification device 4 have waveforms like those shown in FIG. 25A. In the period (b) in which the voltage from the commercial AC power source 1 is low, the voltage V4 and the current 14 have waveforms like those shown in FIG. 25B. In the period (c) in which the output voltage from the rectification device 4 is high, the voltage V4 and the current I4 have waveforms like those shown in FIG. 25C.

FIG. 26 is a circuit diagram showing the 13th embodiment of the present invention. In this embodiment, a first capacitor 8' is connected to the second switching device 6' side in the embodiment shown in FIG. 20.

When a first switching device 5' is turned on, a current flows in a closed circuit of a rectification device 4, the first switching device 5', a primary winding 7-1 of an inductor 7, the first capacitor 8', and the rectification device 4. As a result, the first capacitor 8' is charged. At this time, a power factor improving current flows.

When the first switching device 5' is turned off, a current flows in a closed circuit of the first capacitor 8', a diode 6'-2, the primary winding 7-1 of the inductor 7, and the first capacitor 8'.

When the second switching device 6' is turned on, a current flows in a closed circuit of the first capacitor 8', the primary winding 7-1 of the inductor 7, the second switching device 6', and the first capacitor 8'.

When the second switching device 6' is turned off, a regenerative current flows in a closed circuit of the primary winding 7-1 of the inductor 7, the diode 6'-2, a second capacitor 11', the first capacitor 8', and the primary winding 7-1 of the inductor 7. As a result, the voltage of the second capacitor 11' rises. When the first switching device 5' is turned on, the voltage of the second capacitor 11' drops to become equal to the output voltage from the rectification device 4.

As described above, the 13th embodiment operates in the same manner as the embodiment shown in FIG. 20, and a reduction in distortion and the like can be attained.

FIG. 27 is a circuit diagram showing the 14th embodiment of the present invention. This embodiment is similar to the embodiment shown in FIG. 26. In this embodiment, however, a capacitor 11'" is arranged as part or all of a second capacitor 11' between the output terminals of a rectification device 4 and a pair of switching devices 5 and 6. A diode 27 having the same direction as that of the output polarity of the rectification device 4 is connected in parallel with the capacitor 11'". In this embodiment, when a resonance action is to be substantially performed by only the capacitor 11", the second capacitor 11' serves to pass a high-frequency wave. In addition, a predetermined resonance action may be performed by a combination of the capacitors 11'" and 11'. Furthermore, these capacitors may be combined with a second capacitor connected to any one of the switching devices in a parallel connection form so that a predetermined resonance action can be performed by the three capacitors.

In this embodiment, two or more capacitors 11'"may be arranged between the positive and negative output terminals of the rectification device 4 and the pair of switching devices 5 and 6.

FIG. 28 shows a case wherein the present invention is applied to an illumination apparatus. Referring to FIG. 28, reference numeral 261 denotes an illumination fixture body 261 to be directly mounted on a ceiling. A discharge lamp 9 is mounted on the fixture body 261. A discharge lamp lighting apparatus is arranged in the fixture body 261 constituted by the power supply apparatus according to each of the 2nd to 14th embodiments. Note that the discharge lamp lighting apparatus need not be arranged in the fixture body 261 but may be arranged outside the fixture body 261. In addition, although the illumination apparatus of this embodiment is of a type to be directly mounted on a ceiling, the apparatus may be of another type.

The present invention is not limited to the above embodiments. For example, as the rectification device 4, a low-speed rectification device may be used instead of a high-speed rectification device, and a high-speed diode may be connected to the output side of this low-speed rectification device. In addition, the above embodiments may be properly combined with each other. For example, both the operation of changing the ON/OFF frequency of each switching device and the operation of changing the ON period ratio may be performed.

The 15th to 24th embodiments obtained by further improving the power supply apparatuses of the 1 st to 14th embodiments will be described next.

Several embodiments obtained by improving the basic example in consideration of the above point will be described next.

Figure 29:
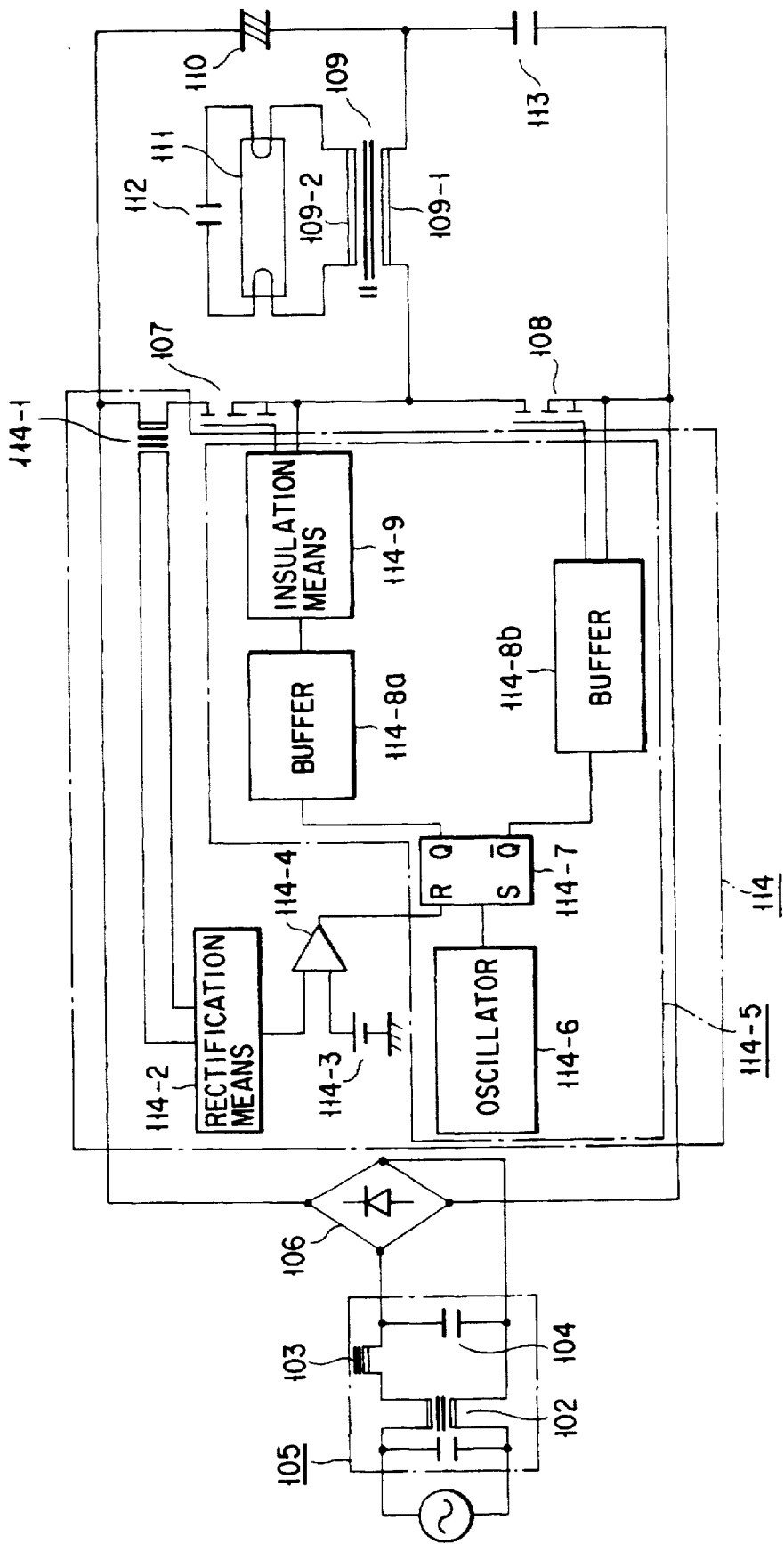
FIG. 29 is a circuit diagram showing the 15th embodiment of the present invention.

The 15th embodiment of the present invention will be described first with reference to FIG. 29. Reference numeral 101 denotes a commercial AC power source. A filter circuit 105 constituted by a common mode choke coil 102, a choke coil 103, a capacitor 104, and the like is connected to this AC power source 1 01. A rectification device 106 as a full-wave rectifier is connected to the filter circuit 105. This rectification device 106 is constituted by, e.g., a diode having high-speed switching characteristics. In addition, first and second switching devices 107 and 108 are connected in a series connection form between the output terminals of the rectification device 106.

A series circuit of a primary winding 109-1 of a leakage type isolating transformer as an inductor 109 and a smoothing capacitor having a relatively large capacitance and serving as a first capacitor 110 is connected to the first switching device 107 in a parallel connection form. The first capacitor 110 exhibits a smoothing effect with respect to the output frequency of the rectification device 106.

In this embodiment, an output circuit is formed at the two terminals of the inductor 109. That is, a secondary winding 109-2 of the inductor 109 serves as an output circuit. A discharge lamp 111 as a load, e.g., a fluorescent lamp, is connected to the secondary winding 109-2. A capacitor 112 for preheating filaments is connected between the filaments of the discharge lamp 111. In this embodiment, the leakage inductance of the inductor 109 also serves as a current-limiting impedance for the discharge lamp 111.

A resonance capacitor having a relatively small capacitance and serving as a second capacitor 113 is connected to the second switching device 108 in a parallel connection form via the primary winding 109-1 of the inductor 109. The capacitance of the second capacitor 113 is extremely smaller than that of the first capacitor 110. The second capacitor 113 resonates with the inductance of the inductor 109 at the switching frequency of the switching devices 107 and 108.

Reference numeral 114 denotes a control unit for controlling the ON/OFF operations of the switching devices 107 and 108. The control unit 114 alternately turns on/off the pair of switching devices 107 and 108 at a substantially constant frequency, and controls the ON period of the switching device 107 such that the peak value of a current flowing in the switching device 107 becomes a predetermined value. In this embodiment, the control unit 114 includes a detection means 114-1 for detecting a current in the switching device 107, a means 114-2 for rectifying an output from the detection means 114-1 to extract the current in the period (a) shown in FIG. 31A, a comparator 114-4 for comparing an output from the rectification means 114-2 with a value from a reference signal source 1 14-3, and an oscillation means 114-5 for outputting an OFF signal to the switching device 107 in accordance with an output from the comparator 114-4. The oscillation means 114-5 in the embodiment includes an oscillator 114-6, a flip-flop 114-7 for receiving outputs from the oscillator 114-6 and the comparator 114-4, a pair of buffers 114-8a and 114-8b for respectively receiving the Q and $\overline{Q}$ outputs from the flip-flop 114-7, and an isolation means 114-9 such as a transformer or a photocoupler inserted between the switching device 107 on the high-voltage side and the buffer 114-8a.

In this embodiment, the output frequency of the oscillation means 114-5 or the ON period may be changed in accordance with an external control signal. In this case, for example, the output frequency of the oscillator 114-6 is changed. Note that the oscillation means 114-5 can be constituted by an IC as a main component. The oscillation means 114-5 is not limited to the one in the embodiment and can be variously modified.

The effects of this embodiment will be described next with reference to FIGS. 30A to 33. Of FIGS. 30A to 31C, FIGS. 30A and 31A show voltages across the second capacitor 113; FIGS. 30B and 31B, currents in the first switching device 107; and FIGS. 30C and 31C, currents in the second switching device 108. FIGS. 30A to 30C correspond to a period in which the non-smoothed DC voltage is relatively high. FIGS. 31A to 31C correspond to a period in which the voltage is relatively low. Referring to FIGS. 30A to 31C, the time axis t is enlarged in correspondence with the switching frequency. FIGS. 38 and 39 respectively show the voltage between the output terminals of the rectification device 106 and the lamp current in the discharge lamp 111. Referring to FIGS. 38 and 39, the time axis t corresponds to the frequency of the AC power source 101.

The basic operation of this embodiment is the same as that of the second embodiment shown in FIG. 5. In the embodiment, when the peak value of a current discharged from the first capacitor 110 via the switching device 107 reaches a predetermined value, i.e., a value from the reference signal source 114-3 (level A in FIGS. 30B and 31B), the oscillation means 114-5 turns off the switching device 107. With this operation, a closed circuit of the inductor 109, the second capacitor 113, and the parasitic diode of the second switching device 108 causes resonance, and a resonance current is reversed and flows when the second switching device 108 is turned on. In this case, since the peak value of a current flowing via the switching device 107 before the occurrence of resonance is controlled to a predetermined value, the peak value of the resonance voltage is also made constant. Since the voltage across the first capacitor 110 is constant, the voltage across the rectification device 106 is made constant, as shown in FIG. 32, if no power source voltage variations and the like occur. Therefore, since voltages applied to the switching devices 107 and 108 are made constant, the switching devices 107 and 108 do not break down due to overvoltages. In addition, as shown in FIG. 33, the lamp current includes almost no ripple of a low frequency (the output frequency of the rectification device). Note that the input current waveform in this case is of a sine wave as in the case shown in FIG. 3A.

In a period (FIGS. 31A to 31C) in which the peak value of an output voltage from the rectification device 106 (non-smoothed DC voltage) is small, the ON period of the first switching device 107 is shorter than that in a period (FIGS. 30A to 30C) in which the peak value is relatively large, and hence the ON period of the second switching device 108 is prolonged accordingly.

Figure 34:
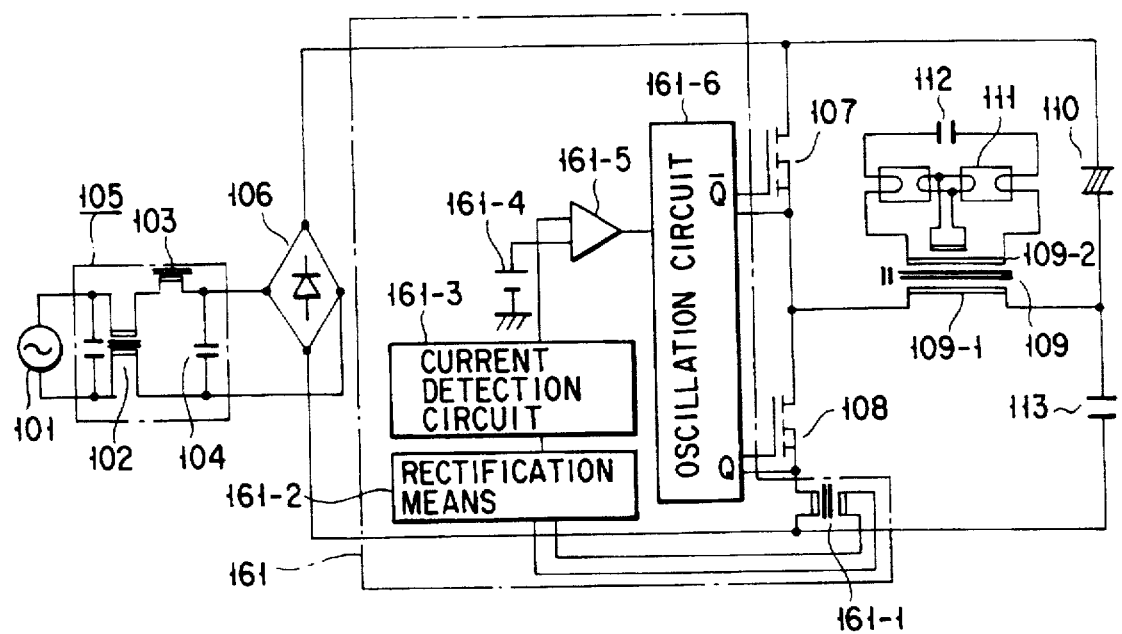
FIG. 34 is a circuit diagram showing the 16th embodiment of the present invention.

FIG. 34 is a circuit diagram showing the 16th embodiment of the present invention. The same reference numerals in FIG. 34 denote the same parts as in FIG. 29, and a description thereof will be omitted (the same applies to the subsequent embodiments). This embodiment is different from the embodiment shown in FIG. 29 in a control unit 161. The control unit 161 includes a current detection means 161-1 for detecting a current in a second switching device 108, and a rectification means 161-2 for extracting the initial value of a resonance current from a detection signal from the current detection means 161-1. The rectification means 161-2 performs rectification to extract a current flowing in the period (b), as shown in FIG. 6B. The control unit 161 also includes a delay means 161-3 for holding an output from the rectification means 161-2 and performs an output operation at the timing of the ON period of a first switching device 107 one or several cycles after the holding operation. The control unit 161 further includes a comparison means 161-5 for comparing an output from the delay means 161-3 with a value from a reference signal source 161-4, and an oscillation means 161-6 for turning off the first switching device 107 in accordance with an output from the comparison means 161-5. The oscillation means 161-6 may be the one shown in FIG. 29.

In this embodiment, the peak value of a discharge current flowing in the first switching device 107 is detected as the initial value of a resonance current flowing in the second switching device 108. As shown in FIGS. 6A to 6E, these values are equal. As is apparent, therefore, peak value control of a discharge current flowing in the second switching device 108 is delayed by one or several cycles with respect to the control in the embodiment shown in FIG. 29, but the same effects as those of the embodiment shown in FIG. 29 can be obtained.

Figure 35:
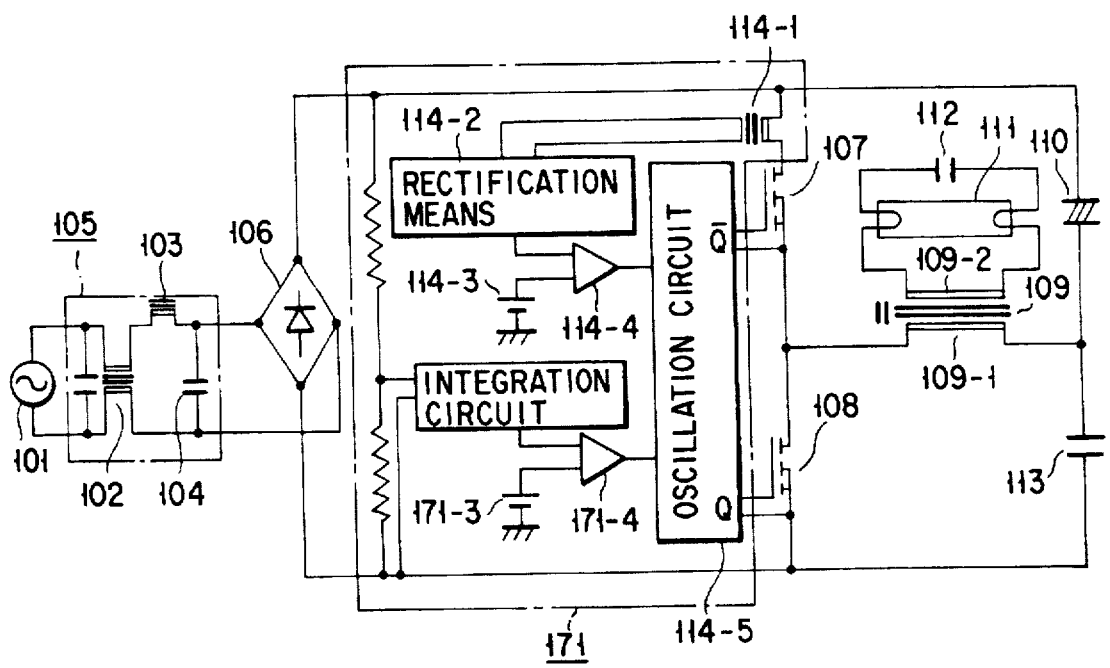
FIG. 35 is a circuit diagram showing the 17th embodiment of the present invention.

FIG. 35 is a circuit diagram showing the 17th embodiment of the present invention. This embodiment is also different from the embodiment shown in FIG. 29 in a control unit 171. More specifically, in addition to the components of the control unit 114 in FIG. 29, the control unit 171 includes a voltage detection means 171-1 for detecting a voltage between the output terminals of a rectification device 106, i.e., a voltage between the terminals of first and second capacitors 110 and 113, a means 171-2 for extracting a detection signal from the voltage detection means 171-1 and delaying it by a certain period of time through, e.g., an integration circuit of the like, and a comparator 171-4 for comparing an output from the means 171-2 with a value from a reference signal source 171-3. The means 171-2 can cope with a change in a voltage having a low frequency almost equal to the output frequency of the rectification device 106. An oscillation means 114-5 shortens the ON period of a second switching device 108 with an increase in output voltage in accordance with a signal from the comparator 171-4, and prolongs the ON period of the second switching device 108 with a decrease in output voltage. In this embodiment, therefore, the switching frequency of the first and second switching devices 107 and 108 may change.

The effects of this embodiment will be described with reference to FIGS. 36 and 37. FIGS. 36 and 37 show currents in the second switching device 108. FIG. 36 shows a current in a case wherein the voltage between the output terminals of the rectification device 106 is relatively high. FIG. 37 shows a current in a case wherein the voltage is relatively low. The control unit 171 shortens the ON period of the second switching device 108 by using the effects of the voltage detection means 171-1 and the like when the voltage between the output terminals of the rectification device 106, i.e., the voltage between the terminals of the first and second capacitors 110 and 113, begins to increase as a low-frequency voltage. As a result, the charge period of the first capacitor 110 is shortened, and the charge amount decreases. For this reason, the voltage between the terminals of the first and second capacitors 110 and 113 begins to decrease as a low-frequency voltage. In contrast to this, when the voltage between the output terminals of the rectification device 106, i.e., the voltage between the terminals of the first and second capacitors 110 and 113, begins to decrease as a low-frequency voltage, the ON period of the second switching device 108 is prolonged. As a result, the charge period of the first capacitor 110 is prolonged, and the charge amount increases.

When, therefore, the voltage between the output terminals of the rectification device 106, i.e., the voltage between the terminals of the first and second capacitors 110 and 113, begins to change because of variations in the voltage of an AC power source 101, variations in load, and the like, the control unit 171 operates in the above manner to control the voltage to a constant value.

Figure 38A:
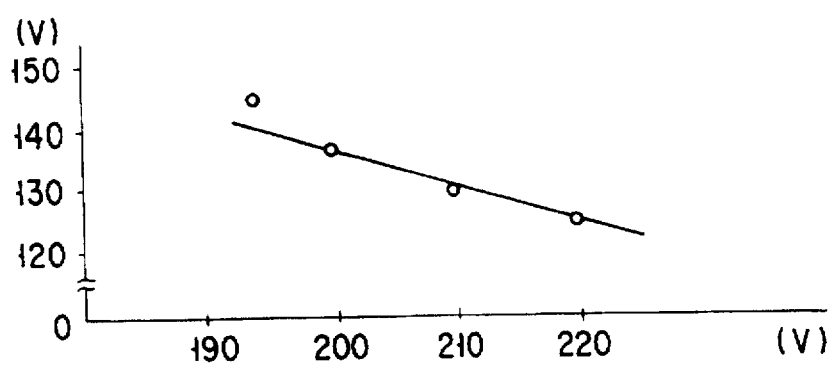
FIGS. 38A to 38E are graphs showing experimental results, specifically a change in each output with a change in power source voltage.
Figure 38B:
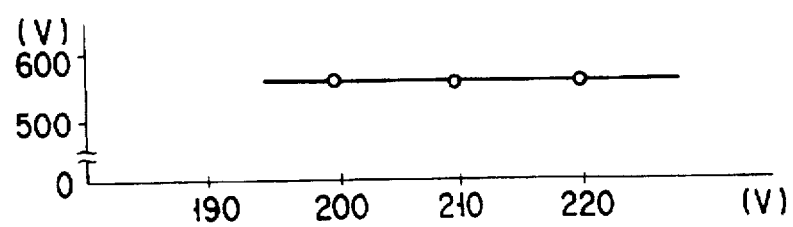
Figure 38C:
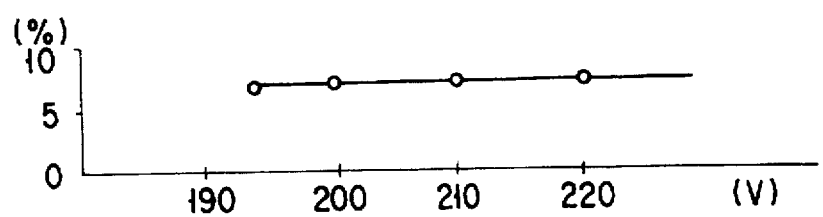
Figure 38D:
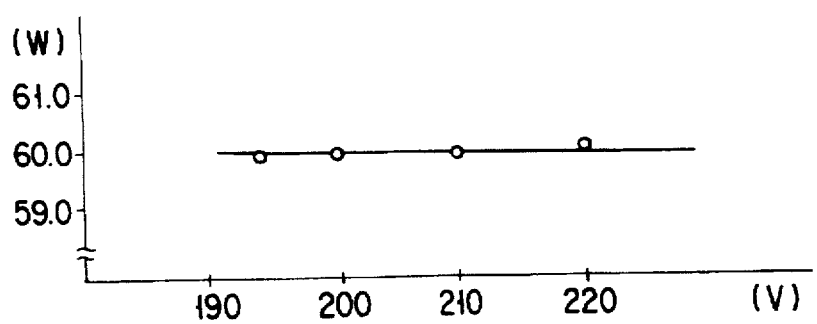
Figure 38E:
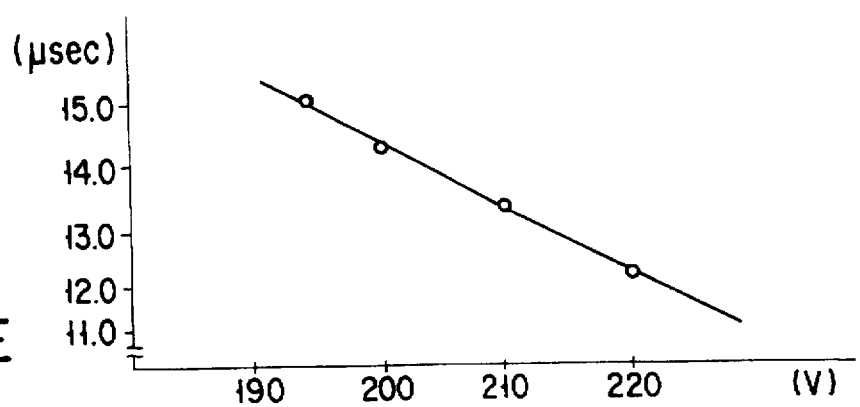
Figure 39:
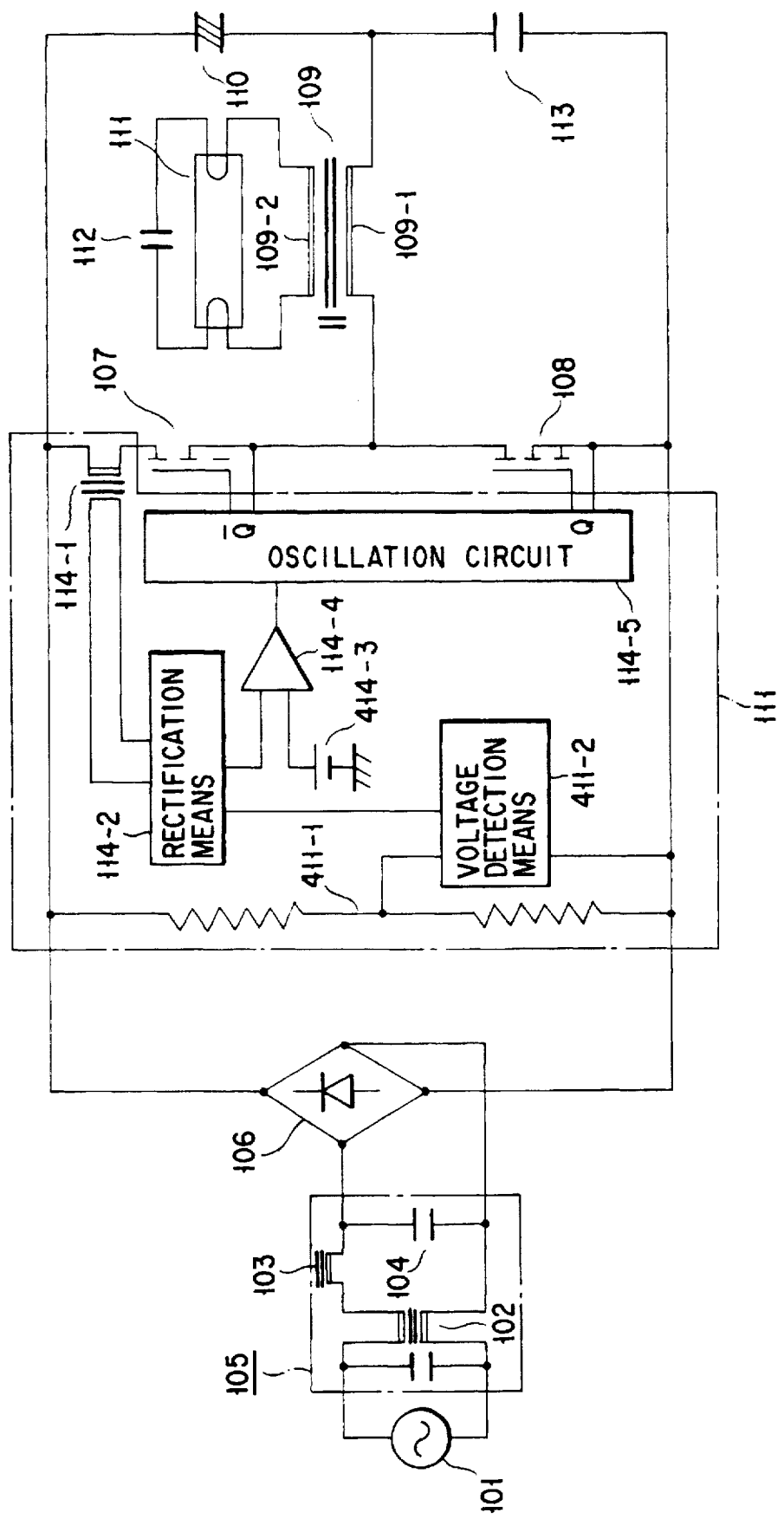
FIG. 39 is a circuit diagram showing the 18th embodiment of the present invention.

FIGS. 38A to 38E show experimental results in this embodiment. FIG. 38A shows the voltage of the first capacitor 110; FIG. 38B, the voltage across the rectification device 106; FIG. 38C, the distortion factor of an input current; FIG. 38D, lamp power; and FIG. 38E, the ON period of the second switching device 108. The abscissa represents the voltage value (V) of the AC power source 101.

The following are the experimental conditions:

AC power source 1 01: 200 V (effective value), 50 Hz
discharge lamp 111: 40-W fluorescent lamp×2 (FLR40SW/M/36 available from Toshiba Lightec) switching frequency of first and second switching devices 107 and 108: about 35 kHz
first capacitor 110: 220 µF
second capacitor 113: 16.6 nF As is apparent from FIGS. 44A to 44E, even if the voltage of the first capacitor 110 is increased/ decreased with respect to a rated voltage of 200 V, the peak value of the current in the first switching device 107 is set to be a predetermined value, and the ON period of the second switching device 108 is controlled in accordance with the voltage across the rectification device 106 (FIG. 44E). With this operation, the voltage across the rectification device 106 (FIG. 44B) can be kept at a substantially constant voltage of about 560 V. Therefore, the lamp power (FIG. 44D) can also be kept at substantially constant power of about 60 W. In addition, the distortion factor of the input current (FIG. 44C) can be kept at a substantially constant value of about 6.5%. It is understood from the relationships shown in FIGS. 44A and 44E that when the voltage of the AC power source 101 increases above the rated voltage, the ON period of the second switching device 108 is shortened to decrease the voltage of the first capacitor 110.

FIG. 39 is a circuit diagram showing the 18th embodiment of the present invention. In this embodiment, in addition to the operation of the embodiment shown in FIG. 29, a predetermined value for determining the ON period of a first switching device 107 is changed in accordance with the voltage between the output terminals of a rectification device 106. More specifically, a control unit 411 includes a voltage detection means 411-1 for detecting the voltage between the output terminals of the rectification device 106, and an output means 411-1 for rectifying a detection signal from the voltage detection means 411-1 and outputting the resultant signal with a predetermined time constant. The output of a rectification means 114-2 is changed in accordance with an output from the output means 411-1. More specifically, when the detection signal from the voltage detection means 411-1 begins to increase, the output of the rectification means 114-2 is changed greatly. In this case, therefore, the ON period of the first switching device 107 becomes relatively short, and the resonance voltage becomes low. In addition, when the detection signal from the voltage detection means 411-1 begins to decrease, the opposite operation is performed. With this operation, the voltage between the output terminals of the rectification device 106 can be made constant.

FIG. 40 is a circuit diagram showing the 19th embodiment of the present invention. In this embodiment, parallel circuits of bipolar transistors and diodes are used as first and second switching devices 107' and 108'. In addition, as a means for detecting the peak value of a current in the first switching device 107' in a control unit 421, a saturable current transformer 422 is used. That is, an input winding 422-1 of the saturable current transformer 422 is connected in series with an input winding 109-1 of an inductor 109. Output windings 422-2 and 422-3 are respectively arranged between the bases and emitters of the transistors of the switching devices 107' and 108'. Although not shown, for example, parallel circuits for impedance adjustment, which are constituted by capacitors and diodes, may be respectively connected to the output windings 422-2 and 422-3 in a series connection form, and discharge circuits may be connected to the capacitors in a parallel connection form, as needed.

In this embodiment, a voltage detection means 423 for detecting, the voltage across the rectification device 106, i.e., the sum voltage of first and second capacitors 110 and 113, is constituted by a rectifier 423-1, a smoothing capacitor 423-2, and a voltage dividing circuit 423-3. This embodiment further includes an error amplifier 425 for receiving an output from the voltage dividing circuit 423-3 and a value from a reference source 424, a driving circuit 426 for outputting a signal in accordance with an output from the error amplifier 425, and a transistor 427. The base current of the transistor 427 is controlled by an output from the driving circuit 426 to change the conductivity. In this manner, the transistor 427 operates in the same manner as a variable resistor so as to control the ON period of the switching device 108'.

In this embodiment, when the value of a current flowing in the switching device 107' reaches a predetermined value, the current transformer 422 is saturated. Since the current flowing in the switching device 107' substantially linearly rises in accordance with the voltage of the first capacitor 110 and the impedance of the inductor 109, the time point at which the saturable current transformer 422 is saturated can be set in advance to coincide with the time point at which the peak value of the current flowing in the switching device 107' reaches the predetermined value. When the current transformer 422 is saturated, the switching device 107' is turned off, and the switching device 108' is turned on. In addition, when the current transformer 422 is saturated by the current flowing in the switching device 108', the switching device 108' is turned off, the switching device 107' is turned on. Subsequently, this operation is repeated. Therefore, in a period in which the peak value of a nonsmoothed DC voltage from the rectification device 106 is large, the values of currents flowing in the first capacitor 110 and the second switching device 108' are relatively large. As a result, the current transformer is saturated relatively quickly, and hence the ON period of the switching device 108' is set to be relatively short. In contrast to this, in a period in which the peak value of a non-smoothed DC voltage from the rectification device 106 is relatively small, the ON period of the switching device 108' is set to be relatively long. With this operation, the ON periods of the first and second devices 107' and 108' are controlled according to the relationship shown in FIG. 30. If an overcurrent flows upon application of an external serge voltage or the like at the time of a power-ON operation, the current transformer 422 is saturated quickly to turn off the second switching device 108', thereby preventing the overcurrent from continuously flowing.

Meanwhile, the voltage value across the rectification device 106 is detected by the voltage detection means 423, and the conductivity of the transistor 427 is controlled in accordance with an error signal based on a predetermined value. More specifically, when, for example, the voltage value across the rectification device 106 decreases owing to variations in power source voltage or variations in load, the conductivity of the transistor 427 decreases. When the conductivity of the transistor 427 decreases, the resistance value increases, and the ON period of the second switching device 108' is prolonged. With this operation, the charge time of the first capacitor 110 is also prolonged to increase the voltage across the first capacitor 110.

In this embodiment, therefore, the resonance voltages can be made constant, and the voltages across the first and second capacitors 110 and 113 can also made constant. Therefore, variations in the voltage across the first capacitor 110 owing to variations in power source voltage, variations in load, and the like can be prevented.

In a case which is not based on this embodiment, although the voltage of the first capacitor 110 is almost constant with respect to the switching frequency owing to the smoothing effect, the voltage varies in accordance with variations in power source voltage and the like. For this reason, if, for example, the power source voltage varies and increases, the voltage of the first capacitor 110 is made constant at a voltage higher than a predetermined value. If the power source voltage decreases, the voltage of the first capacitor 110 is made constant at a voltage lower than the predetermined value. When the voltage is made constant at a high voltage, an excessive voltage is applied to the switching device. When the voltage is made constant at a low voltage, predetermined load power cannot be supplied.

In this embodiment, the means for detecting and controlling the voltage value across the rectification device 106 may be omitted.

FIG. 41 is a circuit diagram showing the 20th embodiment of the present invention. FIG. 41 shows only the main part of the embodiment with the remaining part being omitted. Note that the omitted part may have the same arrangement as that of the embodiment shown in FIG. 40. In this embodiment, as a means 431 for controlling the ON period of a switching device 108', a means for detecting an output voltage from an AC power source 101 (input voltage to a rectification device 106) is used. In order to detect an output voltage from the AC power source 101, rectifiers 431-1 and 431-2 are connected to the output terminals of the AC power source 101, and outputs from the rectifiers 431-1 and 431-2 are input to a time constant circuit 431-3. An output from the time constant circuit 431-3 is input to an error amplifier 425 identical to the one in FIG. 40. Similar to the error amplifier in FIG. 40, the error amplifier 425 compares the output from the time constant circuit 431-3 with a value from a reference signal source 424, and controls a driving circuit 426 and a transistor 427.

In this embodiment, therefore, even if an output voltage from the AC power source varies, the output voltage can be made constant.

FIG. 42 is a circuit diagram showing the 21st embodiment of the present invention. In this embodiment, a second switching device 108 is turned off upon detecting that an output current from a rectification device 106 flows for a predetermined period of time. More specifically, a current detection means 441, a delay means 442, a reference signal source 443, and a comparator 444 are additionally arranged to control an oscillation means 114-5. Since the effects of this embodiment can be easily understood from the above description, a description thereof will be omitted. Although not shown, the resonance voltages are made constant by a control means like the one shown in FIG. 29, 34, or 39.

FIG. 43 is a circuit diagram showing the 22nd embodiment of the present invention. In this embodiment, the ON periods of a pair of switching devices 107 and 108 are controlled in accordance with power supplied to a fluorescent lamp 111 as a load. More specifically, a current detection means 451 and a voltage detection means 452 are arranged, and an oscillation means 114-5 is controlled by a control circuit 153 for receiving detection outputs from these detection means. In this embodiment as well, the resonance voltages can be made constant by a control means like the one shown in FIG. 29, 34 or 39.

Since the effects of this embodiment can be easily understood from the above description, a description thereof will be omitted. In the embodiment, the ON periods of the pair of switching devices 107 and 108 may be controlled in accordance with only the lamp current or the lamp voltage. In addition, the ON period of either of the switching devices may be controlled. Furthermore, the switching frequency may be changed.

Figure 50:
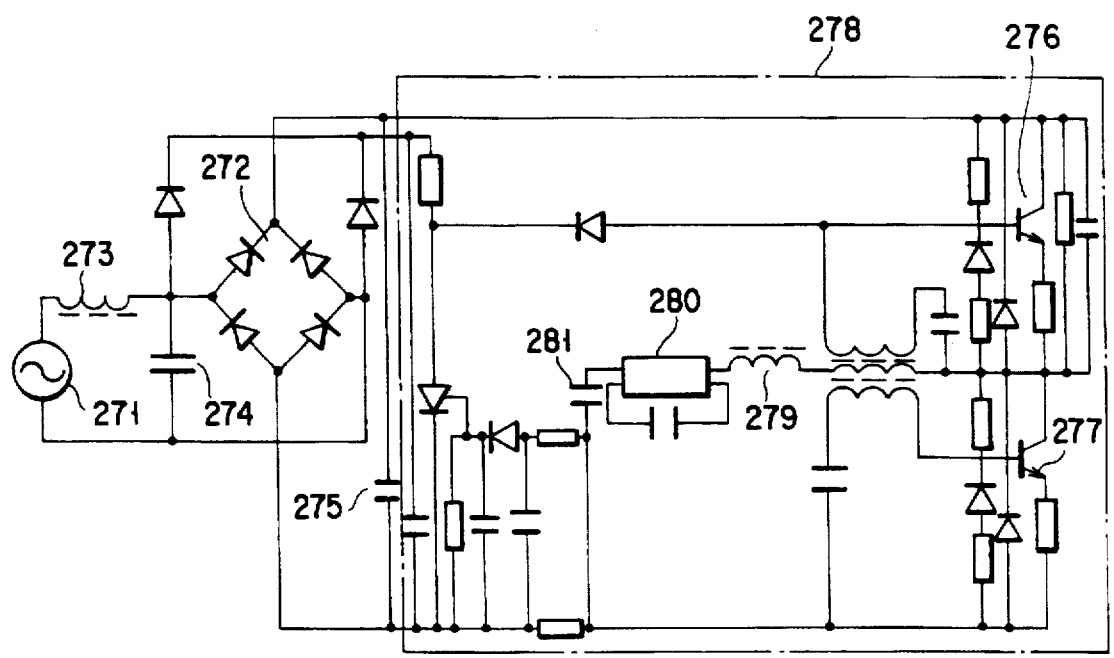
FIG. 50 is a circuit diagram showing prior art 1.
Figure 51:
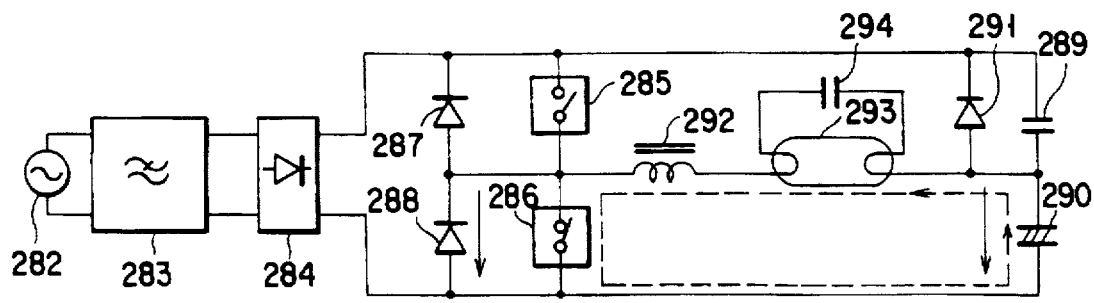
FIG. 51 is a circuit diagram showing prior Art 2.

FIG. 44 is a circuit diagram showing the 23rd embodiment of the present invention. FIG. 50 shows only the main part of the embodiment with the remaining part being omitted. In this embodiment, the connection between first and second capacitors 110 and 113 is reversed vertically with respect to that in FIG. 29. Therefore, the connection between first and second switching devices 107 and 108 is also reversed. In addition, in the embodiment, after a discharge current from the first capacitor 110 flows to the first switching device 107 via an inductor 109 for a predetermined period of time, the first switching device 107 is turned off. More specifically, the embodiment includes a current detection means 461, a comparison means 462 for detecting that a detection value obtained by the current detection means 461 passes through a zero-crossing point and rises, and a timer means 463 for controlling an oscillation means 114-5 after the comparison means 462 detects that the detection value passes through the zero-crossing point.

The effects of this embodiment will be described with reference to FIG. 45. FIG. 45 shows the waveform of a current flowing in the first switching device 107. The comparison means 462 detects zero-crossing time t1 in FIG. 45. The timer means 463 turns off the first switching device 107 a predetermined period t2 after zero-crossing time t1. As is apparent from the above description, therefore, the resonance voltages are made constant.

In this embodiment, the first switching device 107 may be turned off a predetermined period after the time point at which a current flowing in the parasitic diode of the first switching device 107 stops flowing. In this case, if the first switching device 107 is a field-effect transistor, the circuit shown in FIG. 44 can be used without any modification. If the first switching device 107 is a bipolar transistor, the time point at which a current flowing in cross-coupled diodes stops flowing may be detected.

Figure 46:
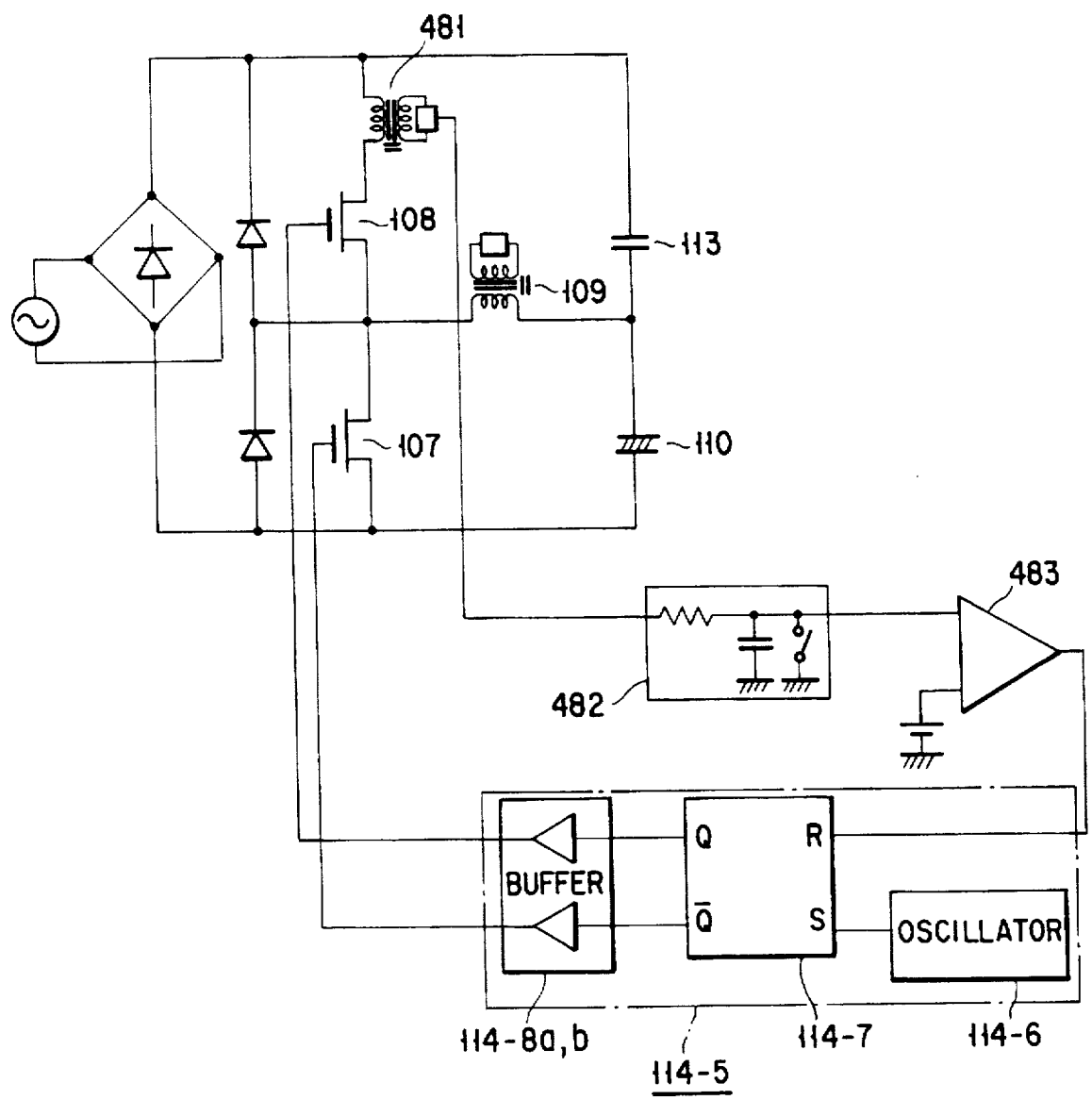
FIG. 46 is a circuit diagram showing the 24th embodiment of the present invention.

FIG. 46 is a circuit diagram showing the 24th embodiment of the present invention. In this embodiment, a second switching device 108 is turned off after a current flows in the second switching device 108 for a predetermined period of time. More specifically, the embodiment includes a current detection means 481 for detecting a current in the second switching device 108, an integrating means 482 for integrating a detection value from the current detection means 481, and a comparison means 483 for comparing an output from the integrating means 482 with a reference value. An oscillation means 114-5 is controlled by an output from the comparison means 483. Note that the oscillation means 114-5 outputs, for example, a signal having a constant frequency.

The effects of this embodiment will be described with reference to FIGS. 47A to 47C. FIG. 47A shows a current flowing in the second switching device 108; 47B, a current flowing in a first switching device 107; and 47C, an output current from a rectification device 106. If the comparison means 483 is set to output a signal to turn off the second switching device 108 when, for example, the integral value reaches the area of the hatched portion of the current waveform shown in FIG. 47A, a current can be reliably supplied from the rectification device 106, as shown in FIG. 47C. That is, a current can be supplied from the rectification device 106 after the resonance current assumes a peak value. With this operation, a high input power factor, a reduction in input current distortion, and a constant output voltage can be achieved.

FIG. 48 is a perspective view showing a case wherein the present invention is applied to an illumination apparatus. Reference numeral 201 denotes an illumination fixture body of a type to be directly mounted on a ceiling. A discharge lamp 111 is mounted on the fixture body 201. A power supply apparatus like the one in one of the 15th to 24th embodiments is arranged, as a discharge lamp lighting apparatus, in the fixture body 201. Note that the discharge lamp light apparatus need not be arranged in the fixture body 201 but may be arranged outside the fixture body 201. Although the illumination apparatus of this embodiment is of a type to be directly mounted on a ceiling, the apparatus may be of another type.

Improvements on the present invention are not limited to the above embodiments. For example, a low-speed rectification device may be used instead of a high-speed rectification device, and a high-speed diode may be connected to the output side of this low-speed rectification device. In addition, the above embodiments may be properly combined with each other.

Figure 49:
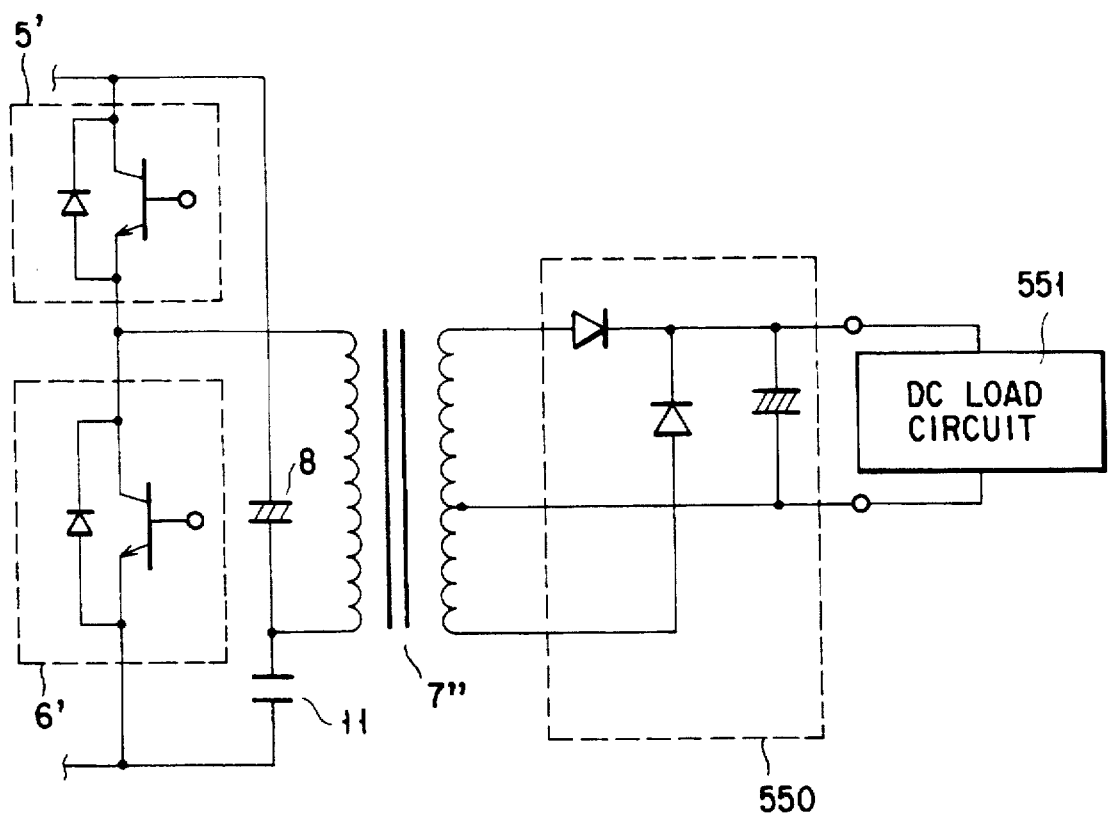
FIG. 49 is a circuit diagram showing the arrangement of the main part of a power source apparatus applied to a DC load circuit.

FIG. 49 shows the arrangement of the main part of a power source apparatus applied to a DC load circuit 551.

In this arrangement, the DC load circuit 551 is connected, via a rectification circuit 550, to the secondary winding side of a transformer 7" whose primary winding side is connected to the node of the above first and second switching devices 5' and 6' and the node of the above first and second capacitor 8 and 11.

This DC load circuit 551 includes a resistive load and general electronic devices and circuits requiring DC power sources.

As has been described above, therefore, according to the present invention, the following effects can be obtained.

According to the first or second aspect of the present invention, since an input current can be supplied from the rectification device throughout substantially the entire period of a rectified non-smoothed DC voltage, a smoothed output can be obtained and, the waveform of an input current from the AC power source can be made similar to a sine wave to attain a reduction in distortion.

According to the third aspect of the present invention, by changing the ON period of one of the switching devices, the energy stored in the inductor can be changed, and the output voltage can be adjusted. In addition, since the switching frequency is substantially constant, no increase in switching loss occurs even though, for example, the switching frequency is increased.

According to the fourth aspect of the present invention, by changing the ratio of the ON periods of the pair of switching devices, the output voltage can be adjusted in the same manner as in the fourth aspect of the present invention. In addition, a sufficiently smoothed output voltage can be obtained by changing the ON period of one of the switching devices in accordance with the peak value of a voltage output from the AC power source every half cycle.

According to the fifth and sixth aspects of the present invention, by changing the switching frequency, the absolute ON period of the other switching device can be changed, and the output voltage can also be changed.

According to the seventh aspect of the present invention, since the second capacitor is connected to the other switching device and the inductor in a parallel connection form, a simple arrangement can be realized.

According to the eighth aspect of the present invention, since the second capacitor is connected between the output terminals of the rectification device, a simple arrangement can be realized, similar to the one according to the seventh aspect of the present invention.

According to the ninth aspect of the present invention, since the second capacitor is connected between the rectification device and the pair of switching devices, a simple arrangement can be realized, similar to the one according to the seventh aspect of the present invention.

According to the 10th aspect of the present invention, the output circuit includes the impedance circuit whose impedance decreases with an increase in frequency. Even if, therefore, the oscillation frequency is increased, the impedance of a route for realizing a reduction in distortion can be kept low, and a sufficient resonance current can be obtained.

According to the 11th aspect of the present invention, since the drive transformer stops the oscillation of the first and second switching devices upon removal of a load, an increase in stress on the first and second switching devices can be prevented.

According to the 12th aspect of the present invention, the pulsation of an output can be reduced, and the luminous efficacy can be improved, thereby reducing the light ripple.

According to the 13th aspect of the present invention, since the ON period of the other switching device in a predetermined period in a starting operation of the discharge lamp is set to be shorter than that in the lamp ON period, the discharge lamp is started after the filaments are sufficiently preheated. Therefore, shortening of the service life of the discharge lamp can be prevented.

According to the 14th aspect of the present invention, the luminous efficacy is improved, and the pulsation of a lamp current can be reduced, thereby attaining a reduction in light ripple.

According to the 15th and 16th aspects of the present invention, since an input current can be supplied from the rectification device throughout substantially the entire period of a rectified nonsmoothed DC voltage, the waveform of an input current from the AC power source can be made similar to a sine wave to attain a reduction in distortion. In addition, since a current in the first switching device which determines the magnitude of a resonance voltage is directly controlled, the resonance voltage can be controlled to an arbitrary value or a constant value.

In the power source apparatus according to the 17th aspect of the present invention, since the ON period of the first switching device is controlled such that the peak value of a current flowing in the first switching device becomes a predetermined value, the resonance voltage can be made constant. This prevents the switching device from breaking down upon application of an excessive voltage. Also, this eliminates the necessity to use a switching device having a high breakdown voltage, and hence prevents an increase in cost.

In the power source apparatus according to the 18th aspect of the present invention, since the integral value of a current flowing in the first switching device is controlled to a predetermined value, substantially the same effects as those of the 17th aspect can be obtained.

In the power source apparatus according to the 19th aspect of the present invention, since the initial value of a resonance current flowing in the first switching device is controlled to a predetermined value, the same effects as those of the 17th aspect can be obtained.

In the power source apparatus according to the 20th aspect of the present invention, the predetermined value of a current, which determines the ON period of the first switching device, is changed in accordance with the voltage values across the first and second switching devices. Therefore, the voltages across the first and second switching devices can be made constant regardless of variations in power source voltage, variations in load, and the like.

In the power source apparatus according to the 21st aspect of the present invention, since the second switching device is turned off after a current flows therein for a predetermined period of time, a charge current can be reliably supplied to the first capacitor. Therefore, an improvement in power factor and a reduction in input current distortion can be attained.

In the power source apparatus according to the 22nd aspect of the present invention, since the second switching device is turned off a predetermined period of time after a peak portion of a resonance current flows, a charge current can be reliably supplied to the first capacitor. Therefore, the same effects as those of the 21st aspect can be obtained.

In the power source apparatus according to the 23rd aspect of the present invention, since an input/output current flows in the rectification device for a predetermined period of time, the same effects as those of the 21st and 22nd aspects can be obtained.

In the power source apparatus according to the 24th aspect of the present invention, since the ON period of the second switching device is controlled in accordance with a voltage value corresponding to the voltage across the first capacitor, the voltage across the first capacitor can be made constant by controlling the charge amount of the first capacitor. With this operation, even if the power source voltage varies, the voltage across the first capacitor can be made constant, and the voltage applied to the load can also be made constant.

In the power source apparatus according to the 25th aspect of the present invention, since the ON period of the second switching device is controlled in accordance with an AC power source voltage, the voltage across the first capacitor can be made constant by controlling the charge amount of the first capacitor. With this operation, even if the power source voltage varies, the voltage across the first capacitor can be made constant, and the voltage applied to the load can also be made constant.

In the power source apparatus according to the 26th aspect of the present invention, since the ON period of the second switching device is controlled in accordance with an output from the output circuit, the amount of power supplied to the load can be made constant.

According to the 27th aspect of the present invention, in order to apply the present invention to a discharge lamp lighting apparatus, a discharge lamp is used as a load of the power source apparatus. Therefore, the pulsation of the output is further reduced to improve the luminous efficacy and reduce the light ripple.

According to the 28th aspect of the present invention, in order to apply the present invention to an illumination apparatus, the discharge lamp lighting apparatus of the 31st aspect is arranged in the apparatus boy. Therefore, the luminous efficacy is improved to attain reductions in the pulsation of a lamp current and light ripple.

In the power source apparatus according to the 29th aspect of the present invention, a high-frequency voltage generated by the resonance system of the resonance capacitor means and the induction means is formed in an AC voltage rectified by the rectification means. With this operation, the rectified output voltage is made equal to the input voltage to ensure an input current even in a period in which the AC voltage is low, thereby attaining reductions in the distortion and harmonic components of the input current.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A power supply apparatus comprising:
    a rectification device for rectifying an input voltage from an AC power source and outputting a nonsmoothed DC voltage from a pair of output terminals;
    first and second switching devices connected in series between the pair of output terminals of said rectification device, and alternately turning on/off at a frequency higher than a frequency of the AC power source;
    a series circuit, including a first capacitor and an inductor, connected between two terminals of said first switching device, for smoothing the nonsmoothed DC voltage output from said rectification device;
    a second capacitor configured to resonate with said inductor in accordance with ON/OFF operations of said first and second switching devices; and
    an output circuit for obtaining a high-frequency output on a basis of the resonance caused by said inductor and said second capacitor.

2. A power supply apparatus comprising:
    a rectification device for rectifying an input voltage from an AC power source and outputting a non-smoothed DC voltage from a pair of output terminals;
    first and second switching devices connected in series between the pair of output terminals of said rectification device, and alternately turning on/off at a frequency higher than a frequency of the AC power source;

a first capacitor having a relatively large capacitance connected in parallel to said first switching device;

an inductor connected in series between said first switching device and said first capacitor; and a second capacitor having a capacitance smaller than that of said first capacitor, and configured to resonate with said inductor in an ON period of said second switching device; and an output circuit for obtaining a high-frequency output on a basis of the resonance caused by said inductor and said second capacitor.

3. An apparatus according to claim 1 or 2, further comprising switching control means for turning on/off said first and second switching devices at a substantially constant frequency and capable of changing a ratio of ON periods of said switching devices.

4. An apparatus according to claim 1 or 2, further comprising switching control means for turning on/off said first and second switching devices at a substantially constant frequency and capable of changing a ratio of ON periods of said first and second switching devices, said switching control means shortening the ON period of said second switching device as a voltage output from said AC power source every half cycle is increasing, and prolonging the ON period as the voltage output from said AC power source every half cycle is decreasing.

5. An apparatus according to claim 1 or 2, further comprising switching control means capable of changing an ON/OFF frequency of said first and second switching devices.

6. An apparatus according to claim 5, wherein said first and second switching devices are turned on/off at a relatively low frequency in a period corresponding to a small peak value of an output voltage from said rectification device, and are turned on/off at a relatively high frequency as the peak value increases.

7. An apparatus according to claim 1 or 2, wherein said second capacitor is connected in parallel across a series connection of said second switching device and said inductor.

8. An apparatus according to claim 1 or 2, wherein said second capacitor is arranged between the output terminals of said rectification device.

9. An apparatus according to claim 1 or 2, wherein said second capacitor is connected in parallel with a diode having the same polarity as an output polarity of said rectification device and is arranged between at least one output terminal of said rectification device and said first and second switching devices.

10. An apparatus according to claim 1 or 2, wherein an impedance circuit whose impedance decreases with an increase in frequency is arranged in said output circuit.

11. An apparatus according to claim 1 or 2, further comprising:

a transformer having primary and secondary windings, the primary winding serving as said inductor and the secondary winding serving as said output circuit;

a load connected in parallel across said secondary winding and to which power is supplied via said output circuit; and drive control of said first and second switching devices is performed by an output from said secondary winding of said transformer.

12. An apparatus according to claim 1 or 2, further comprising a discharge lamp serving as a load and coupled to said output circuit.

13. An apparatus according to claim 12, wherein the ON period of said second switching device in a predetermined period during a starting operation of said discharge lamp is set to be longer than that an ON period of said discharge lamp.

14. An apparatus according to claim 12, wherein at least said discharge lamp is mounted on an illumination fixture body.

15. A power supply apparatus comprising:

a rectification device for rectifying an AC voltage and outputting a non-smoothed DC voltage;

first and second switching devices connected in series and alternately turning on/off at a frequency higher than a frequency of said AC voltage;

a first capacitor connected in parallel to said first switching device, said first capacitor being charged by an output from said rectification device via said second switching device during an ON period of said second switching device so as to perform a smoothing operation with respect to a frequency of an output from said rectification device, and said first capacitor being discharged via said first switching device during an ON period of said first switching device;

an inductor coupled between a node of said first and second switching devices and said first capacitor, and allowing a charge current and a discharge current to pass to/from said first capacitor;

a second capacitor configured to resonate with said inductor in accordance with ON/OFF operations of said first and second switching devices;

a control unit for controlling the ON period of said first switching device in accordance with a value of a discharge current discharged from said first capacitor and flowing in said first switching device so as to control a value of a resonance voltage generated by said inductor and said second capacitor; and an output circuit for obtaining a high-frequency output on a basis of the resonance caused by said inductor and said second capacitor.

16. A power supply apparatus comprising:

a rectification device having a pair of output terminals and connected to an AC power source;

first and second switching devices connected in series between said pair of output terminals of said rectification device, and turning on/off at a frequency higher than a frequency of the AC power source;

a series circuit of a first capacitor having a relatively large capacitance and an inductor, said series circuit connected in parallel across said first switching device;

a second capacitor having a relatively small capacitance and arranged to form a resonance circuit with said inductor in accordance with ON/OFF operations of said first and second switching devices;

a control unit having a detection means for detecting a current flowing in said first switching device, and controlling an ON period of said first switching device in accordance with a detection signal from said current detection means; and an output circuit for obtaining a high-frequency output on a basis of resonance caused by said inductor and said second capacitor.

17. An apparatus according to claim 15 or 16, wherein said control unit controls the ON period of said first switching device such that a peak value of a discharge current discharged from said first capacitor and flowing in said first switching device becomes a predetermined value.

18. An apparatus according to claim 15 or 16, wherein said control unit controls the ON period of said first switching device such that an integral value of a discharge current discharged from said first capacitor via said inductor and said first switching device becomes a predetermined value.

19. An apparatus according to claim 15, wherein said control unit controls the ON period of said first switching device such that an initial value of a resonance current flowing in said second switching device becomes a predetermined value.

20. An apparatus according to claim 15 or 16, wherein said control unit changes a predetermined value of a current value for determining the ON period of said first switching device in accordance with voltage values across said first and second switching devices.

21. An apparatus according to claim 15 or 16, wherein said control unit turns off said second switching device after a current flows therein for a predetermined period of time.

22. An apparatus according to claim 15 or 16, wherein said control unit turns off said second switching device a predetermined period of time after a peak portion of a resonance current generated by said inductor and said second capacitor flows in said second switching device.

23. An apparatus according to claim 15 or 16, wherein said control unit turns off said second switching device after at least one of input and output currents flows in said rectification device for a predetermined period of time.

24. An apparatus according to claim 15 or 16, wherein said control unit controls the ON period of said second switching device in accordance with a voltage value corresponding to a voltage across said first capacitor.

25. An apparatus according to claim 15 or 16, wherein said control unit controls the ON period of said second switching device in accordance with an AC voltage value.

26. An apparatus according to claim 15 or 16, wherein said control unit controls the ON period of said second switching device in accordance with an output from said output circuit.

27. An apparatus according to claim 15 or 16, further comprising a discharge lamp serving as a load and coupled to said output circuit.

28. An apparatus according to claim 27, wherein at least said discharge lamp is mounted on an illumination fixture body.

29. A power supply apparatus comprising:
a rectification means having input and output sides;
first and second switching elements connected in series across the output side of said rectification means;
a circuit, comprising,
a load,
smoothing capacitor means having a relatively large capacitances, and
induction means to which a load is connected,
said circuit being connected in series with one of said first and second switching elements; and
resonance capacitor means, having a capacitance smaller than that of said smoothing capacitor means, for forming a resonance circuit in cooperation with said induction means.

* * * * *